US 8,768,976 B2

(12) United States Patent
McLachlan et al.

(10) Patent No.: US 8,768,976 B2
(45) Date of Patent: Jul. 1, 2014

(54) OPERATIONAL-RELATED DATA COMPUTATION ENGINE

(75) Inventors: Paul McLachlan, Newcastle, WA (US); Tavis Elliott, Bothell, WA (US)

(73) Assignee: Apptio, Inc., Bellevue, WA (US)

(*) Notice: Subject to any disclaimer, the term of this patent is extended or adjusted under 35 U.S.C. 154(b) by 413 days.

(21) Appl. No.: 12/467,120

(22) Filed: May 15, 2009

(65) Prior Publication Data
US 2010/0293163 A1 Nov. 18, 2010

(51) Int. Cl.
G06F 7/00 (2006.01)
G06F 17/30 (2006.01)

(52) U.S. Cl.
USPC .......................................... 707/805; 707/809

(58) Field of Classification Search
None
See application file for complete search history.

(56) References Cited

U.S. PATENT DOCUMENTS

| 5,249,120 | A | 9/1993 | Foley |
| 5,799,286 | A | 8/1998 | Morgan et al. |
| 5,970,476 | A | 10/1999 | Fahey |
| 5,991,741 | A | 11/1999 | Speakman et al. |
| 6,014,640 | A | 1/2000 | Bent |
| 6,032,123 | A | 2/2000 | Jameson |
| 6,208,993 | B1 * | 3/2001 | Shadmon .............................. 1/1 |
| 6,308,166 | B1 | 10/2001 | Breuker et al. |
| 6,507,825 | B2 | 1/2003 | Suh |
| 6,578,005 | B1 | 6/2003 | Lesaint et al. |
| 6,839,719 | B2 | 1/2005 | Wallace |
| 6,983,321 | B2 | 1/2006 | Trinon et al. |
| 7,634,431 | B2 | 12/2009 | Stratton |
| 7,742,961 | B2 | 6/2010 | Aaron et al. |
| 7,774,458 | B2 | 8/2010 | Trinon et al. |
| 7,783,759 | B2 | 8/2010 | Eilam et al. |
| 7,930,396 | B2 | 4/2011 | Trinon et al. |
| 7,933,861 | B2 * | 4/2011 | Zadorozhny .................. 707/600 |
| 7,966,235 | B1 | 6/2011 | Capelli et al. |
| 8,024,241 | B2 | 9/2011 | Bailey et al. |
| 8,175,863 | B1 | 5/2012 | Ostermeyer et al. |
| 8,423,428 | B2 | 4/2013 | Grendel et al. |
| 8,484,355 | B1 | 7/2013 | Lochhead et al. |
| 2002/0123945 | A1 | 9/2002 | Booth et al. |
| 2003/0083888 | A1 | 5/2003 | Argenton et al. |
| 2003/0139960 | A1 | 7/2003 | Nishikawa et al. |
| 2003/0172368 | A1 * | 9/2003 | Alumbaugh et al. ......... 717/106 |

(Continued)

OTHER PUBLICATIONS

International Search Report and Written Opinion for International Patent Application No. PCT/US2010/035021 mailed Jul. 14, 2010.

(Continued)

Primary Examiner — Rehana Perveen
Assistant Examiner — Raheem Hoffler
(74) Attorney, Agent, or Firm — John W. Branch; Lowe Graham Jones PLLC

(57) ABSTRACT

A computation system includes a receiver, a schema generator, and a table generator. The receiver receives operational related data relating to an IT environment of an organization from remote systems. The schema generator organizes the operational related data into at least one class of IT metric-oriented data based on at least one intrinsic characteristic of the operational related data to generate a schema. The operational related data includes data tables corresponding to IT assets of the organization. The table generator processes an input table based on the schema to generate an output table. The input table includes a starting table having one or more columns. The output table identifies a subset of interrelated data included in the starting table.

61 Claims, 22 Drawing Sheets

(56) References Cited

U.S. PATENT DOCUMENTS

| | | | |
|---|---|---|---|
| 2003/0236721 | A1 | 12/2003 | Plumer et al. |
| 2004/0093344 | A1 | 5/2004 | Berger et al. |
| 2004/0111509 | A1 | 6/2004 | Eilam et al. |
| 2004/0186762 | A1 | 9/2004 | Beaven et al. |
| 2005/0060317 | A1* | 3/2005 | Lott et al. .............. 707/10 |
| 2005/0120032 | A1 | 6/2005 | Liebich et al. |
| 2006/0080264 | A1 | 4/2006 | Zhang et al. |
| 2006/0085465 | A1* | 4/2006 | Nori et al. .............. 707/101 |
| 2006/0106658 | A1 | 5/2006 | Johanson et al. |
| 2006/0161879 | A1 | 7/2006 | Lubrecht et al. |
| 2006/0167703 | A1 | 7/2006 | Yakov |
| 2006/0190497 | A1 | 8/2006 | Inturi et al. |
| 2006/0200477 | A1 | 9/2006 | Barrenechea |
| 2006/0212334 | A1 | 9/2006 | Jackson |
| 2006/0224946 | A1* | 10/2006 | Barrett et al. .............. 715/503 |
| 2006/0228654 | A1 | 10/2006 | Sanjar et al. |
| 2006/0282429 | A1 | 12/2006 | Hernandez-Sherrington et al. |
| 2007/0113289 | A1 | 5/2007 | Blumenau |
| 2007/0124162 | A1 | 5/2007 | Mekyska |
| 2007/0198982 | A1 | 8/2007 | Bolan et al. |
| 2007/0226090 | A1 | 9/2007 | Stratton |
| 2007/0276755 | A1 | 11/2007 | Rapp |
| 2007/0282626 | A1 | 12/2007 | Zhang et al. |
| 2008/0033774 | A1 | 2/2008 | Kimbrel et al. |
| 2008/0201269 | A1 | 8/2008 | Hollins et al. |
| 2008/0295096 | A1 | 11/2008 | Beaty et al. |
| 2009/0012986 | A1* | 1/2009 | Arazi et al. .............. 707/102 |
| 2009/0018880 | A1 | 1/2009 | Bailey et al. |
| 2009/0100406 | A1 | 4/2009 | Greenfield et al. |
| 2009/0150396 | A1* | 6/2009 | Elisha et al. .............. 707/8 |
| 2009/0216580 | A1 | 8/2009 | Bailey et al. |
| 2009/0300173 | A1 | 12/2009 | Bakman et al. |
| 2010/0005014 | A1 | 1/2010 | Castle et al. |
| 2010/0005173 | A1 | 1/2010 | Baskaran et al. |
| 2010/0042455 | A1 | 2/2010 | Liu et al. |
| 2010/0082380 | A1 | 4/2010 | Merrifield, Jr. et al. |
| 2010/0125473 | A1 | 5/2010 | Tung et al. |
| 2010/0169477 | A1 | 7/2010 | Stienhans et al. |
| 2010/0211667 | A1 | 8/2010 | O'Connell, Jr. |
| 2010/0250421 | A1 | 9/2010 | Ariff et al. |
| 2010/0250642 | A1 | 9/2010 | Yellin et al. |
| 2010/0299233 | A1 | 11/2010 | Licardi et al. |
| 2010/0306382 | A1 | 12/2010 | Cardosa et al. |
| 2010/0325606 | A1 | 12/2010 | Sundararajan et al. |
| 2010/0332262 | A1 | 12/2010 | Horvitz et al. |
| 2011/0016214 | A1 | 1/2011 | Jackson |
| 2011/0016448 | A1 | 1/2011 | Bauder et al. |
| 2011/0022861 | A1 | 1/2011 | Agneeswaran et al. |
| 2011/0106691 | A1 | 5/2011 | Clark et al. |
| 2011/0167034 | A1 | 7/2011 | Knight et al. |
| 2011/0225277 | A1 | 9/2011 | Freimuth et al. |
| 2012/0066020 | A1 | 3/2012 | Moon et al. |
| 2012/0131591 | A1 | 5/2012 | Moorthi et al. |
| 2012/0232947 | A1 | 9/2012 | McLachlan et al. |
| 2012/0233217 | A1 | 9/2012 | Purpus et al. |
| 2012/0233547 | A1 | 9/2012 | McLachlan |
| 2013/0060595 | A1 | 3/2013 | Bailey |
| 2013/0103654 | A1 | 4/2013 | McLachlan et al. |
| 2013/0201193 | A1 | 8/2013 | McLachlan et al. |
| 2013/0282537 | A1 | 10/2013 | Snider |

OTHER PUBLICATIONS

International Preliminary Report on Patentability for International Patent Application No. PCT/US2010/035021 mailed Nov. 24, 2011.
"Program Evaluation and Review Technique," Wikipedia, the free encyclopedia, accessed Mar. 13, 2012, 10 pages http://en.wikipedia.org/wiki/Program_Evaluation_and_Review_Technique—last modified Mar. 12, 2012.
"Project management," Wikipedia, the free encyclopedia, accessed Mar. 13, 2012, 14 pages http://en.wikipedia.org/wiki/Project_management—last modified Mar. 7, 2012.
International Search Report and Written Opinion for International Patent Application No. PCT/US2012/028353 mailed Oct. 31, 2012.
International Search Report and Written Opinion for International Patent Application No. PCT/US2012/028378 mailed on Sep. 12, 2012.
Official Communication for U.S. Appl. No. 13/324,253 mailed Sep. 25, 2012.
"Notice from the European Patent Office dated Oct. 1, 2007 concerning business methods," Official Journal EPO, Nov. 2007, pp. 592-593.
Extended European Search Report in EP Application No. 13151967.0/1955, mailed Apr. 19, 2013.
Official Communication for U.S. Appl. No. 13/324,253 mailed Jan. 10, 2013.
Official Communication for U.S. Appl. No. 13/324,253 mailed Mar. 19, 2013.
Official Communication for U.S. Appl. No. 13/452,628 mailed Apr. 22, 2013.
Official Communication for U.S. Appl. No. 13/324,253 mailed Jan. 23, 2014.
Official Communication for U.S. Appl. No. 13/675,837 mailed Jan. 31, 2014.
Official Communication for U.S. Appl. No. 13/917,503 mailed Jan. 31, 2014.
Robinson Glen, Cloud Economics—Cost Optimization (selected slides), Amazon Web Services AWS, Slideshare, Feb. 28, 2012 http://www.slideshare.net/AmazonWebServices/whats-new-with-aws-london.
Skilton et al, Building Return on Investment from Cloud Computing, The open Group Whitepaper, mladina webpages, Apr. 2010 http://www.mladina.si/media/objave/dokumenti/2010/5/31/31_5_2010_open_group_building_return-on-investment-from-cloud-computing.pdf.
Ward Miles, Optimizing for Cost in the Cloud (selection), AWS Summit, Slideshare Apr. 2012 http://www.slideshare.net/AmazonWebServices/optimizing-your-infrastructure-costs-on-aws.
Amazon Reserved Instances, Amazon Web Services, archives org, Jan. 14, 2013 http://web.archive.org/web/2012011453849/http://aws.amazon.com/rds/reserved-instances/?.
Cost Optimisation with Amazon Web Services, extracted slides, Slideshare Jan. 30, 2012 http://www.slideshare.net/AmazonWebServices/cost-optimisation-with-amazon-web-services?from_search=1.
Deciding an Approach to the cloud AWS Reserved Instances, Cloudyn webpages, Feb. 28, 2012 https://www.cloudyn.com/blog/deciding-an-approach-to-the-cloud-aws-reserved-aws.
Ganesan Harish, Auto Scaling using AWS, Amazon Web Services AWS (selected slides), Apr. 20 2011 http://www.slideshare.net/harishganesan/auto-scaling-using-amazon-web-services-aws.
International Preliminary Report on Patentability for International Patent Application No. PCT/US2012/028353 mailed Sep. 19, 2013.
International Preliminary Report on Patentability for International Patent Application No. PCT/US2012/028378 mailed Sep. 19, 2013.
Official Communication for U.S. Appl. No. 13/415,797 mailed Oct. 3, 2013.
"Activity Based Costing is the best allocation methodology," APPTIO, Community for Technology Business Management, Mar. 16, 2010, 2 pages.
Busch, J., "Six Strategies for IT Cost Allocation," Spend Matters, Jan. 5, 2011, 3 pages http://spendmatters.com/2011/01/05/six-strategies-for-it-cost-allocation/.
"IT Cost Transparency and Apptio," Dec. 4, 2008, 2 pages http://web.archive.org/web/20081204012158/http://www.apptio.com/solutions.
Official Communication for U.S. Appl. No. 13/324,253 mailed Sep. 6, 2013.
Official Communication for U.S. Appl. No. 13/917,478 mailed Nov. 7, 2013.
Official Communication for U.S. Appl. No. 13/837,815 mailed Oct. 23, 2013.
Official Communication for U.S. Appl. No. 13/675,837 mailed Oct. 10, 2013.
"Apptio Extends Leadership in Cloud Business Management with Launch of Apptio Cloud Express," Apptio, Dec. 12, 2012, 2 pages

(56) References Cited

OTHER PUBLICATIONS http://www.apptio.com/news/apptio-extends-leadership-cloud-business-management-launch-apptio-cloud-express#.Ukm4r8X7Lco.

Talbot, C., "Apptio Cloud Express Provides Free Usage Tracking Service," talkincloud.com, Dec. 12, 2012, 4 pages http://talkincloud.com/cloud-computing-management/apptio-cloud-express-provides-free-usage-tracking-service.

"Visualization for Production Management: Treemap and Fisheye Table Browser," Open-Video Organization webpages, 2001, 2 pages http://www.open-video.org/details.php?videoid=4547.

Vizard, M., "Free Service from Apptio Tracks Cloud Service Provider Pricing," IT Business Edge, Dec. 12, 2012, 6 pages http://www.itbusinessedge.com/blogs/it-unmasked/free-service-from-apptio-tracks-cloud-service-provider-pricing.html.

"Apptio Optimizes Enterprise IT Costs Utilizing Amazon Web Services Cloud Computing," Apptio, Apr. 7, 2009, 2 pages http://www.apptio.com/news/apptio-optimizes-enterprise-it-costs-utilizing-amazon-web-services-cloud-computing#.Ukm5XsX7Lco.

Ricknäs, M., "Apptio unveils tool to keep track of cloud costs," ComputerWorld, Dec. 12, 2012, 1 page http://www.computerworld.com/s/article/9234630/Apptio_unveils_tool_to_keep_track_of_cloud_costs.

Morgan, T. P., "Apptio puffs up freebie cost control freak for public clouds," The Register, Dec. 12, 2012, 2 pages http://www.theregisterco.uk/2012/12/12/apptio_cloud_express.

"Automating Cost Transparency," Apptio, 2008, 15 pages htto://www.cio.com/documents/whitepapers/AutomatedCostTransparency.pdf.

"Amazon Elastic Computer Cloud (Amazon EC2)", archive.org, Oct. 21, 2011, 9 pages http://web.archive.org/web/20111029130914/http://aws.amazon.com/ec2/#pricing.

"Cloud Computing and Sustainability: The Environmental Benefits of Moving to the Cloud," Accenture, archive.org, Aug. 31, 2011, 17 pages http://web.archive.org/web/20110813022626/http://www.accenture.com/SiteCollectionDocuments/PDF/ Accenture_Sustainability_Cloud_Computing_
TheEnvironmentalBenefitsofMovingtotheCloud.pdf.

Official Communication for U.S. Appl. No. 13/917,503 mailed Oct. 10, 2013.

Official Communication for U.S. Appl. No. 13/935,147 mailed Oct. 22, 2013.

Official Communication for U.S. Appl. No. 13/452,628 mailed Nov. 18, 2013.

Official Communication for U.S. Appl. No. 14/033,130 mailed Dec. 16, 2013.

* cited by examiner

| Server | Server Product | Service |
|---|---|---|
| aspwcall3 | ASP.NET | eBanking |
| aspweban8 | ASP.NET | eBanking |
| aspwequi9 | ASP.NET | Equity Trading |
| citwcomm13 | Citrix | Commodity Trading |

FIG. 2C

| Service | SLA |
|---|---|
| Call Center | Priority 12x5 support |
| eBanking | Critical 24x7 support |
| Equity Trading | Best Effort |
| Commodity Trading | Priority 12x5 support |

FIG. 2D

| Location | Subnet | Employees | Capacity |
|---|---|---|---|
| London | 172.16.2 | 5 | 1400 |
| Seattle | 172.16.54 | 3 | 3300 |
| Paris | 172.16.81 | 7 | 2400 |

FIG. 2E

| ID 236 | Description 238 | Object 240 | Start 242 | End 244 |
|---|---|---|---|---|
| 52539 | not responding to ping, not serving web pages | 172.16.2.12 | 11/5/2007 02:12:17 PM | 11/12/2007 08:14:14 AM |
| 53034 | URL returns an error | 172.16.2.53 | 11/7/2007 11:13:32 AM | 11/12/2007 08:14:14 AM |
| 53372 | MMPC alert could not be successfully inserted | 172.16.2.12 | 11/8/2007 01:42:41 PM | 11/13/2007 05:50:15 AM |
| 53873 | MMPC alert could not be successfully inserted | 172.16.2.12 | 11/9/2007 04:06:44 PM | 11/12/2007 04:16:04 PM |

FIG. 2F

| Network Scan | | | | | | DNS | Service Servers | | SLAs | Data Centers | | | | Alerts | | | |
|---|---|---|---|---|---|---|---|---|---|---|---|---|---|---|---|---|---|
| Host | CPU | Disk Capacity | Disk Used | OS | Size | Name | Server Product | Service | SLA | Location | Subnet | Employees | Capacity | ID | Description | Start | End |
| 172.16.2.12 | 55% | 20 GB | 16.84 GB | Windows 2003 | 1 | aspwcall3 | ASP.NET | eBanking | Critical 24x7 support | London | 172.16.2 | 5 | 1400 | 52539 | not responding to ping, not serving web pages | 11/5/2007 14:12 | 11/12/2007 8:14 |
| 172.16.2.53 | 32% | 120 GB | 37.75 GB | Windows 2003 | 1 | aspweban8 | | eBanking | Critical 24x7 support | Seattle | 172.16.2 | 5 | 1400 | 3 | 2 | 3 | 3 |
| 172.16.54.11 | 30% | 20 GB | 12.08 GB | Windows 2003 | 1 | aspwequi9 | ASP.NET | Equity Trading | Best Effort | Paris | 172.16.54 | 3 | 3500 | | | | |

FIG. 9A

| SLAs | | | | DNS | Data Centers | | | | Network Scan | | | | | Alerts | | | |
|---|---|---|---|---|---|---|---|---|---|---|---|---|---|---|---|---|---|
| Service | SLA | Server | Server Product | IP | Location | Subnet | Employees | Capacity | CPU | Disk Capacity | Disk Used | OS | Size | ID | Description | Start | End |
| Call Center | Priority 12x5 support | | | | | | | | | | | | | | | | |
| eBanking | Critical 24x7 support | 2 | ASP.NET | 2 | London | 172.16.2 | 5 | 1400 | 87 | 140 | 54.59 GB | Windows 2003 | 2 | 4 | 3 | 4 | 4 |
| Equity Trading | Best Effort | aspwequi9 | ASP.NET | 172.16.54.11 | Seattle | 172.16.54 | 3 | 3300 | 30% | 20 | 12.08 GB | Windows 2003 | 1 | | | | |
| Commodity Trading | Priority 12x5 support | citwcomm1 | Citrix | 172.16.81.93 | Paris | 172.16.81 | 7 | 2400 | 51% | 20 | 12.32 GB | Windows 2003 | 1 | | | | |

FIG. 9B

| Service | Business |
|---|---|
| Call Center | Retail Bank |
| Call Center | Investment Bank |
| eBanking | Retail Bank |
| eBanking | Investment Bank |
| Equity Trading | Investment Bank |
| Commodity Trading | Investment Bank |

FIG. 11A

| | SLAs | |
|---|---|---|
| Service | SLA | Server |
| 2 | 2 | 2 |
| 4 | 3 | 4 |

| | | | DNS | | Data Centers | | | | | Network Scan | |
|---|---|---|---|---|---|---|---|---|---|---|---|
| Business | Service | SLA | Server | Server Product | IP | Location | Subnet | Employees | Capacity | CPU | Disk Capacity |
| Retail Bank | 2 | 2 | 2 | ASP.NET | 2 | London | 172.16.2 | 5 | 1400 | 87 | 140 |
| Investment Bank | 4 | 3 | 4 | | 4 | 3 | 3 | 15 | 7100 | 168 | 180 |

| | | Alerts | | | |
|---|---|---|---|---|---|
| Disk Used | OS | Size | ID | Description | Start | End |
| 54.59 GB | Windows 2003 | 2 | 4 | 3 | 4 | 4 |
| 78.99 | Windows 2003 | 4 | 4 | 3 | 4 | 4 |

FIG. 11B

| Service Servers | | | DNS | Network Scan | | | | | |
|---|---|---|---|---|---|---|---|---|---|
| Business | Server | Server Product | Service | IP | Host | CPU | Disk Capacity | Disk Used | OS |
| Retail Bank | aspwcall3 | ASP.NET | eBanking | 172.16.2.12 | 172.16.2.12 | 55% | 20 GB | 16.84 GB | Windows 2003 |
| Retail Bank | aspweban8 | ASP.NET | eBanking | 172.16.2.53 | 172.16.2.53 | 32% | 120 GB | 37.75 GB | Windows 2003 |
| Investment Bank | aspwcall3 | ASP.NET | eBanking | 172.16.2.12 | 172.16.2.12 | 55% | 20 GB | 16.84 GB | Windows 2003 |
| Investment Bank | aspweban8 | ASP.NET | eBanking | 172.16.2.53 | 172.16.2.53 | 32% | 120 GB | 37.75 GB | Windows 2003 |
| Investment Bank | aspwequi9 | ASP.NET | Equity Trading | 172.16.54.11 | 172.16.54.11 | 30% | 20 GB | 12.08 GB | Windows 2003 |
| Investment Bank | citwcomm13 | Citrix | Commodity Trading | 172.16.81.93 | 172.16.81.93 | 51% | 20 GB | 12.32 GB | Windows 2003 |

FIG. 11C

| Business | FTEs | Revenue |
|---|---|---|
| Retail | 3423 | $10,322,332.00 |
| Investment | 238 | $3,812,322.00 |

FIG. 12A

| Business | FTEs | Revenue |
|---|---|---|
| RTL | 3423 | $10,322,332.00 |
| INV | 238 | $3,812,322.00 |

FIG. 12B

| Full | Short | Abbrev |
|---|---|---|
| Retail Bank | Retail | RTL |
| Investment Bank | Investment | INV |

OPERATIONAL-RELATED DATA COMPUTATION ENGINE

TECHNICAL FIELD

Embodiments of the present invention relate to computing systems, and more particularly, to a system for processing operational data for further computation.

BACKGROUND

Currently, in general, schemas are manually identified by humans conducting interviews with staff engineers and examining the source code, database schemas and data of the applications being integrated. It is a process that can take a long time even for highly experienced individuals. In some cases, the effort and difficulty involved is so great that the end result is not worth pursuing.

Calculation engines are typically encumbered to deal with the complexity of multiple tables in code. If a relational database is in use, it is possible to manually construct a fully linked table one column at a time by using a SQL "View" command, and specify, for each column, what the aggregation function should be. Generally speaking, the effort of putting together such SQL View commands means that only certain columns are included in the linked tables, which dramatically reduces the value of the final linked table. If a column is needed for calculations that was not included (or the wrong aggregation function was selected), the entire operation must be redone in order to bring it in to view.

Business entities often desire to quantify the costs associated with various assets owned, controlled or otherwise operated by them, including, for example collecting asset-related data pertaining to information technology (IT) assets (e.g., servers, employee computers or client systems, networking equipment, etc.).

The desire to quantify such costs may arise in connection with financial audits, accounting analysis, operation performance reviews, investment assessments, or any other asset-related analysis. One issue faced by such entities is that they suffer from a deluge of disparate systems for storing information (e.g., IT departments often control or operate large numbers of different systems, devices and software assets, with tracking information stored on a variety of platforms and systems). Consequently, when a business entity collects data relevant to these costs, such operational-related data is likely to be received from a variety of sources, and presented in different formats. When trying to process operational-related data to better quantify such costs, the schema that relates the operational-related data together becomes important.

BRIEF DESCRIPTION OF THE DRAWINGS

The present invention is illustrated by way of example and not by way of limitation, in the figures of the accompanying drawings and in which:

FIG. 2C is a table illustrating an example of Service Servers of an IT department.

FIG. 2D is a table illustrating an example of SLA of an IT department.

FIG. 2E is a table illustrating an example of Data Centers of an IT department.

FIG. 2F is a table illustrating an example of Alerts of an IT department.

FIG. 9A is a table illustrating an example of a linked table.

FIG. 9B is a table illustrating another example of a linked table.

FIG. 11A is an example of an input table.

FIG. 11B is an example of a fully linked table.

FIG. 11C is an example of a strong mapping table based on the input table of FIG. 11A and the fully linked table of FIG. 11B.

FIGS. 12A, 12B, 12C are examples of weak mapping tables.

FIG. 14 is a screenshot illustrating an example of a mapping table.

FIG. 16 is a screenshot illustrating al example of a user interface for hints specification.

DETAILED DESCRIPTION

Figure 1A:
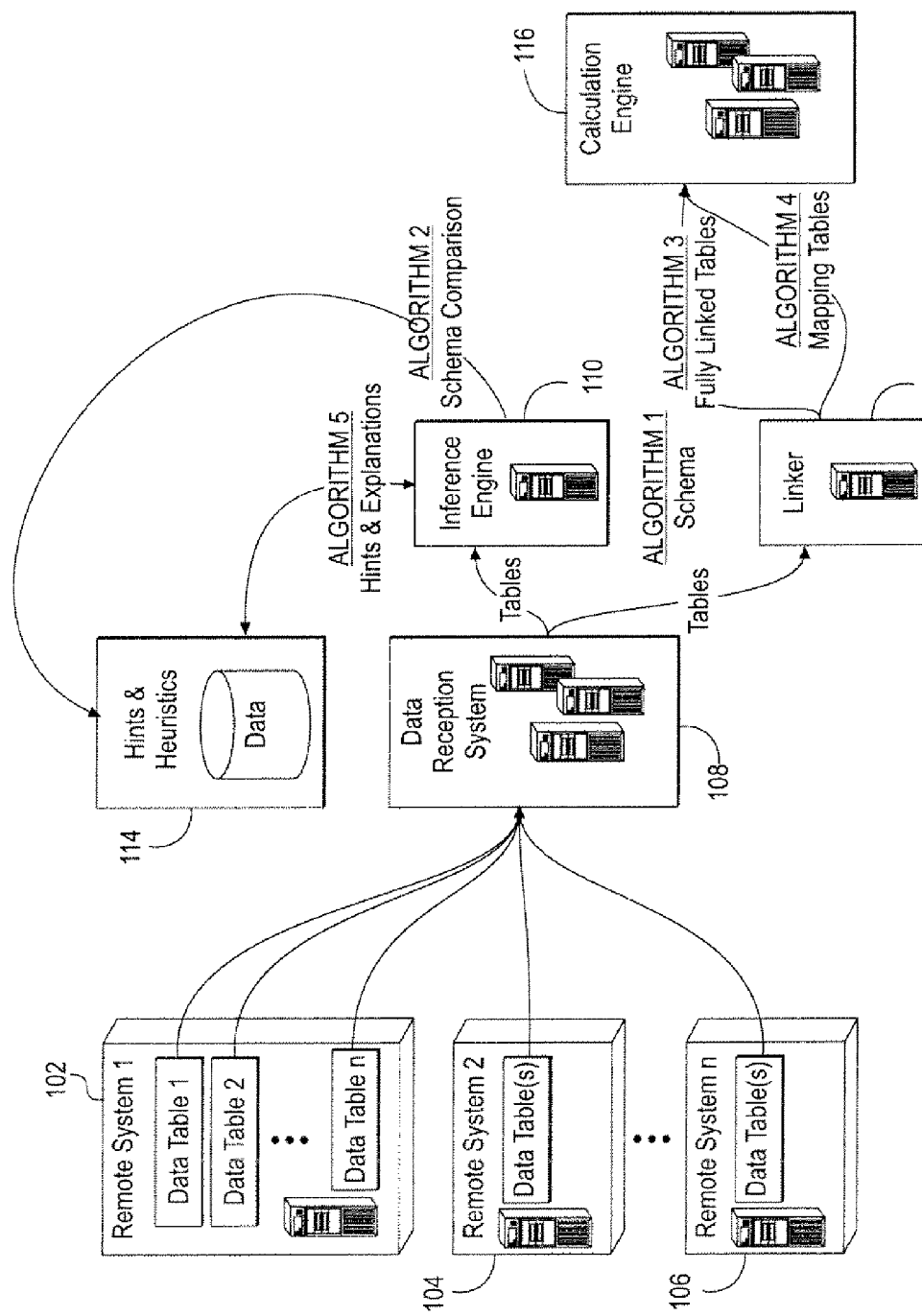
FIG. 1A is a block diagram illustrating one embodiment of a networked system for processing operational-related data.

Described herein is a method and apparatus for automatically processing operational-related data received from various sources and in different formats and for organizing such data in classes of logically connected information and appropriate formats, in a way that is particularly conducive to the specification of asset-related cost calculation models and engines.

Business entities often desire to quantify the costs associated with various assets owned, controlled or otherwise operated by them, including, for example collecting asset-related data pertaining to information technology (IT) assets (e.g., servers, employee computers or client systems, networking equipment, etc.). To obtain a more complete picture of the costs incurred by such entities in the course of their operation, services-related data may also be collected and quantified. These services-related data can includes, for example, (a) lists of work tickets (e.g., help desk call logs) and other information relating to activities of IT professionals, possibly broken down by time, (b) lists of vendor contracts (e.g., maintenance contracts for computer hardware and software), possibly to be apportioned to various departments and/or applications, and (c) any other data relating to the cost of services or asset utilization (e.g., computer utilization percentages, how much data storage space is being used, allocation tables and/or application maps indicative of which particular assets are being utilized by which specific users). For purposes of this application, the term "operational-related data" is used to indicate any asset-related data, services-related data, or any operation of asset-related data or services-related data.

For purposes of various embodiments of the present invention, a business entity or "entity" could by (a) any corporation, business, partnership, educational institution governmental organization, and any other entity organized or otherwise existing under any applicable legislation, in any jurisdiction around the world, whether for profit or nonprofit, (b) any department or other subunit of any of the foregoing, and (c) any combination of the foregoing. To the extent that an individual or family possesses a sufficiently high number of information technology devices or systems, or other assets to which embodiments of the present invention may apply, such individual or family could also be a business entity with respect to applicable embodiments of the present invention.

When the operational-related data is organized in classes of logically connected information and appropriately formatted, subsequent processing of such data to organize and quantify the corresponding costs becomes significantly easier, more efficient and more accurate. For example, using intelligent and efficient schema could enable structuring operational-related data in predefined classes and formats that are suitable for presentation to a quantitative analysis engine, such that the engine can then use the operational-related data to determine asset-related costs. In general, in reference to data, a "schema" is a set of constraints on the structure and content of the data, or defines relationships between subsets of the data. Schemas generally define data structuring models at a relatively high level of abstraction.

FIG. 1A is a block diagram illustrating one embodiment of a networked system for processing operational-related data. In one embodiment, the operational-related data is stored in each remote system in the form of data tables. Remote system 102, 104, 106 transmit operational-related data to data reception system 108. Each remote system may be a desktop computer, laptop, server, PDA, TV, or any other device with data processing capability. Each remote system can exist locally in the same facility, or may be at a remote location (e.g. remote customer site) and accessible over a network or combination of networks (e.g., Ethernet, Internet, cellular, WIMAX, or any other types of wired and/or wireless networks, LAN, WAN, MAN, etc.).

Data reception system 108 can receive the operational-related data in many forms. For example, the operational-related data may be in the form of CSV (comma separated value), a RDBMS (e.g. SQL) query result, Excel, parses of log files, XML transformations and integration with product specific API's, or any other forms in which data is processed, stored or transmitted.

Inference engine 110 examines the input tables to automatically produce a schema to Linker engine 112. In one embodiment, the schema is a description of relationships between input tables. In one embodiment, a schema can be generated by organizing the operational related data into at least one class of IT metric-oriented data based on at least one intrinsic characteristic of the operational related data. In general, IT metric-oriented data is information that, based on its characteristics, type and content, is particularly adapted to serve as the basis for determination of IT metrics. When processing operational-related data to better quantify costs associated with various IT-related assets owned, controlled or otherwise operated by a business entity, it could be very helpful to determine one or more IT metrics that relate to the operational-related data and can quantify resource utilization, return on investment, or any other measure of financial or operational performance of the respective business entity. In a more general sense, such metrics could be developed for any types of such assets, not just IT assets; in that case, the resulting metrics would be conceptually similar with the IT metrics (e.g., also measured in Dollar terms, or also measured in resource utilization units), and determined in analogous ways (e.g., in one embodiment, determining resource utilization of an IT asset (e.g. a computer) employs substantially the same analytical process as that used to determine resource utilization of a non-IT asset (e.g., a vehicle operated by a customer service division of a business entity). Processing of operational-related data to organize it into IT metric-oriented data is further described in this patent in connection with various embodiments. In one embodiment, once generated, such IT metric-oriented data is adapted to be subsequently used by properly configured data processing engines and associated logic to produce corresponding IT metrics.

An example of such schema production from interference engine 110 is further described below with respect to FIG. 4. In accordance with various embodiments of the present invention, an engine could consist of one or more data processing logic modules, where each module is implemented using hardware logic, software logic, or a combination of hardware and software logic. The hardware logic could include a computer system (whether a local client computer or a remote server) or some other data processing system (e.g., computing resources running in a cloud computing environment). The software logic could include one or more software programs and/or processes running on the computer system.

Inference engine 110 also compares two schemas or data sets for equivalence. In other words, this allows a determination that a new set of input tables follows the general form of a previous set of input tables; that is, that the apparent relationships between the tables has not changed. The purpose is generally to ensure that a calculation engine will produce valid results on the new set of input data. An example of such schema comparison from interference engine 110 is further described below with respect to FIG. 7.

Linker engine 112 generates a "fully linked table" given a schema and a starting table/column pair. The fully linked table is a single table that contains every row and column in the starting table. Additionally, it contains the columns of every other table that can be related to the starting table, either directly or indirectly (through other tables). Where, for a given additional column, there are multiple values that match the starting table's row, a reduction algorithm may be used in order to produce values for the cells in that column.

Several reduction algorithms can be used, depending upon the purpose of the fully linked table. In a particular implementation, the following algorithm is used:

a. If the values are numbers, they are added together.

b. If the values are strings, the number of unique values is counted and the count is used in the cell; except where there is only one value repeated multiple times, in which case that value is put into the cell.

In another implementation, an algorithm keeps each distinct value in the cell on a third dimension—in particular, this may be used during the generation of a mapping table, as further described below.

In one embodiment of the invention, inference engine 110 and linker engine 112 are included in the same unit, denoted a data processing subsystem. Whether independent or included in the same data processing subsystem, inference engine 110 and linker engine 112 each consist of software running on a processor, special purpose data processing hardware, or a combination of the foregoing. An example of such fully linked table generation from linker engine 112 is further described below with respect to FIG. 8.

In one embodiment, Linker engine 112 is also configured to further generate a "mapping table" with calculation engine 116 given a schema, a starting table/column pair and an ending table/column pair. In one implementation, the mapping table lists, for every value in the starting table/column, all of the matching ending table/column values. An example of such mapping table generation from linker engine 112 is further described below with respect to FIG. 13.

Inference engine 10 may also be configured to accept hints and produce explanatory and troubleshooting information to help humans understand and influence the produced schema. In practice, it occurs that data contains values that should not in actuality be used to determine that there is a relationship between two tables. The easiest example of this is the "N/A" string (Not Available). In general, it is not necessarily true that every column that has the string "N/A" in it should be linked to every other column that has that string—that may not be useful behavior. Such hints and explanation operation is further described with respect to FIG. 15. Hints may be stored in a storage device 114 that communicates with inference engine 110.

Figure 1B:
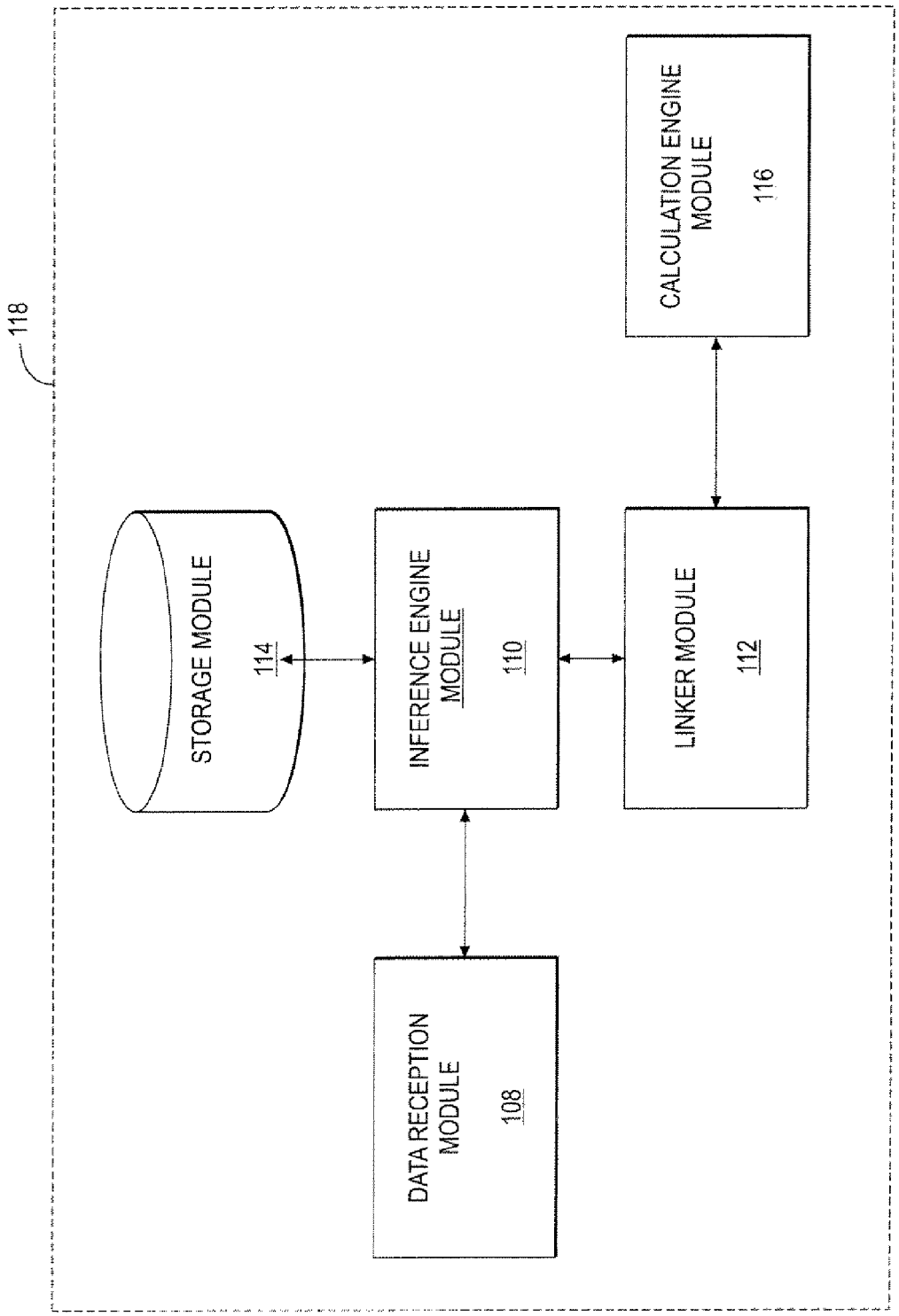
FIG. 1B is a block diagram illustrating one embodiment of a system for processing operational-related data.

FIG. 1B is a block diagram illustrating another embodiment of a system 118 for processing operational-related data. System 118 includes data reception module 108, inference engine module 110, linker module 112, storage module 114, and calculation engine module 116. All these components may reside on a single computing system 118.

Figure 2A:
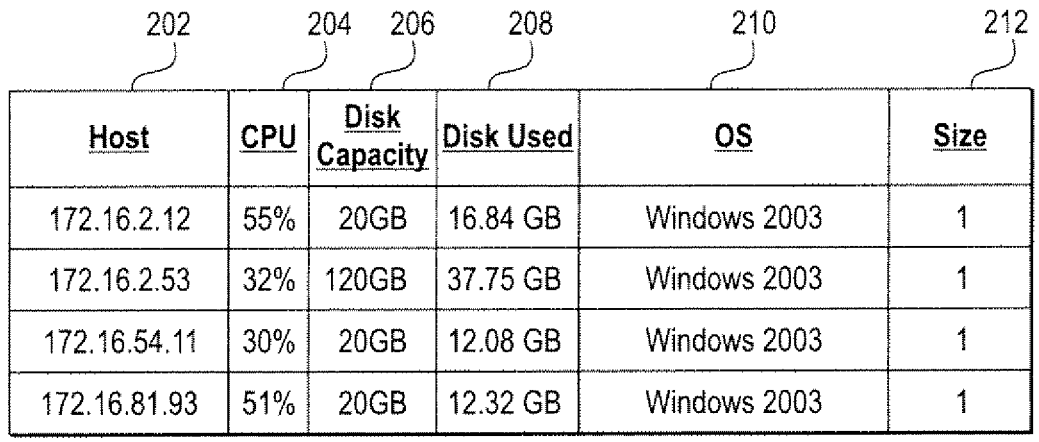
FIG. 2A is a table illustrating an example of a network scan of an IT department.
Figure 2B:
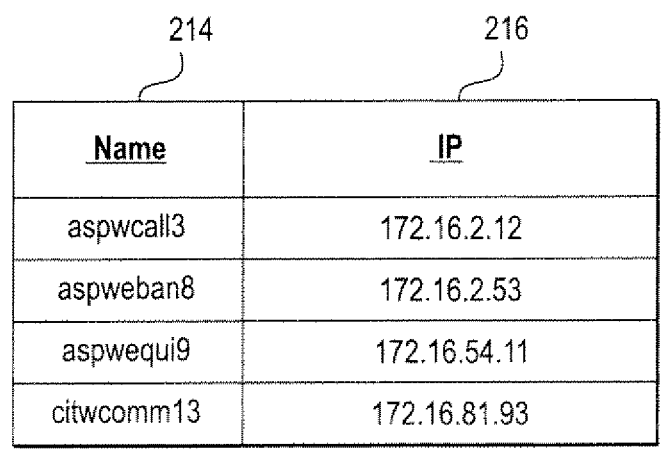
FIG. 2B is a table illustrating an example of DNS of an IT department.

Data reception engine 108 is configured to receive one or more sets of input data in table format. To illustrate in further detail the operation of the exemplary embodiment shown in FIG. 1A, consider the following sample operational-related data, formatted in a sequence of tables, which provides information regarding the IT department of a small company. FIG. 2A is a table illustrating an example of a network scan of an IT department. Column 202 includes the host IP number. Column 204 includes the CPU usage. Column 206 includes the Disk Capacity. Column 208 includes Disk usage. Column 210 includes the Operating System. Column 212 includes the size. FIG. 2B is a table illustrating an example of DNS of an IT department. Column 214 includes the server name. Column 216 includes the IF address, FIG. 2C is a table illustrating an example of Service Servers of an IT department. Column 218 includes the server name. Column 220 includes the Server Product. Column 222 includes the Service product. FIG. 2D is a table illustrating an example of SLA of an IT department. Column 224 includes the service type. Column 226 includes the Service Level Agreement (SLA). FIG. 2E is a table illustrating an example of Data Centers of an IT department. Column 228 includes the geographic location of the server. Column 230 includes the subnet. Column 232 includes the number of employees. Column 234 includes the support capacity of each location. FIG. 2F is a table illustrating an example of Alerts of an IT department. Column 236 includes the ID of each server. Column 238 includes a description of each server. Column 240 includes the IP address of a machine or object to be addressed. Column 242 includes a start time. Column 244 includes an end time.

Figure 3:
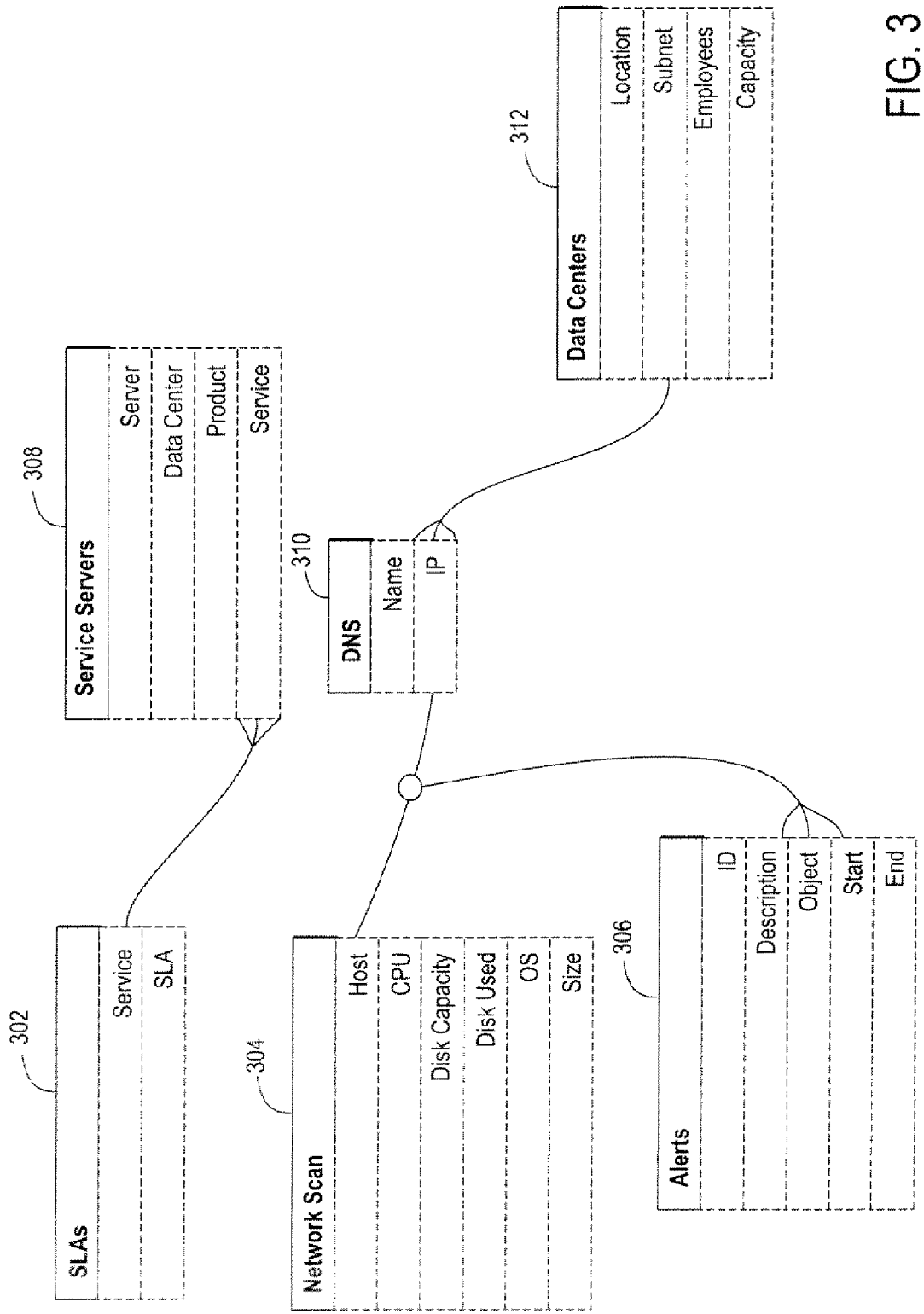
FIG. 3 is a block diagram of an example of a schema generated by an inference engine module.

FIG. 3 is a block diagram of an example of a schema generated by an inference engine module based on the tables illustrated in FIGS. 2A-2F. The schema shown in this figure illustrates a graphical representation of the relationships between the tables of FIGS. 2A-2F. In particular, the schema can be generated by organizing the operational related data into at least one class of IT metric-oriented data based on at least one intrinsic characteristic of the operational related data. For example, Service element of SLA table 302 is related to Service element of Service Servers table 308. Server element from Service Servers table 308 is related to the Name element of DNS table 310. IP element of DNS table 310 is also related to Host element of Network Scan table 304, Object element of Alerts table 306, and Subnet element of Data Centers table 312.

Figure 4:
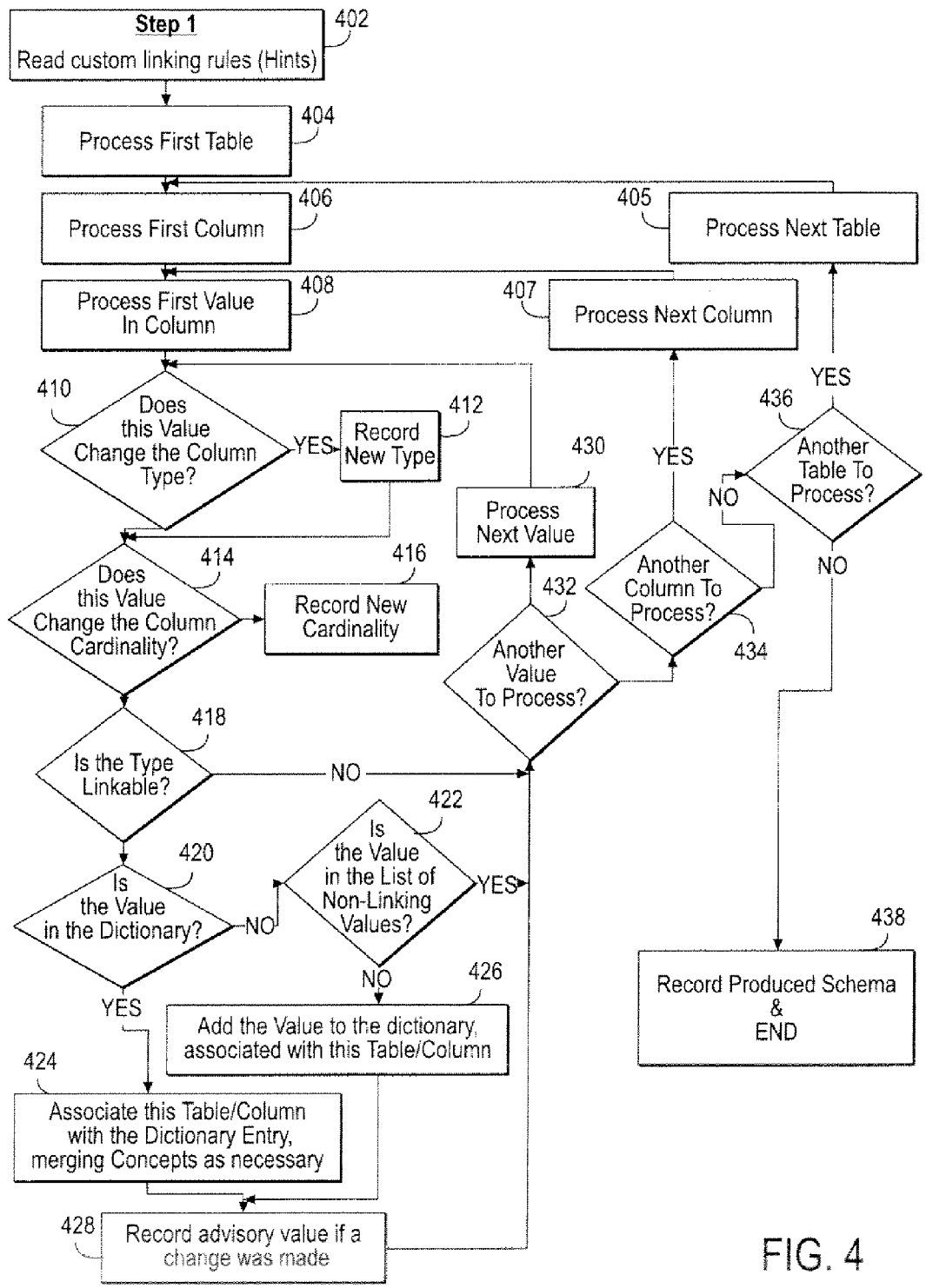
FIG. 4 is a flow diagram illustrating one embodiment of a process of the inference engine module.

FIG. 4 is a flow diagram illustrating one embodiment of a process of the inference engine module. At 402, customizable linking rules (also referred to as hints) are read. Examples of custom linking rules includes: not linking tables based on certain values. Some of the default non-linking values include "null", "N/A", and " ". Another example includes not linking table A, column B to table C, column D.

In accordance with this embodiment, at 404, 406, 408, the first value of the first column in the first table is processed. Subsequently, the next value of the first column is processed in a similar fashion at 430 until all values from the first column are processed as determined at 432. The values of the next column are then similarly processed at 407 until all columns have been processed as determined at 434. The values and columns from the remaining tables 405 are also processed in a similar fashion until all tables have been processed as determined at 436. After all values, columns, tables have been processed, the produced schema is recorded at 438.

In this embodiment, at 410, the process determines whether the value change the column type. If it does, the new type is recorded at 412. In one implementation, columns start out with a type of 'unknown', and are promoted to other types based on the values processed. In one implementation, a value affects the type of the column until a column has a type defined. In one embodiment, the following rules are applied:

(1) If the user has defined a column value type as a hint, use that type. This is necessary in some circumstances, for example, numeric account numbers, which should not be treated as numbers but as opaque strings—but this is not determined by the algorithm.

(2) Trim whitespace out of the value and ignore case.

(3) If the value is blank (or a non-linking value), ignore it for the purposes of value type determination.

(4) Note if the value starts with a currency symbol and strip it for the remainder of analysis.

(5) Note if the value ends with a percentage strip it for the remainder of analysis.

(6) if every character is a digit (or grouping separator or decimal separator), the value is numeric, unless it is currency or a percentage (see previous steps), or unless it is an IPv4 address (of the form 192.168.3.3).

(7) Otherwise, if the value can be parsed as a date (try all date formats in series), the value is a date. There is a large list of possible date formats, including: MMM YY, DD MMM-YYYY, YYYY, etc.

(8) Otherwise, the value is a String. Strings that are very long can be flagged as non-linkable as a performance optimization. For example, it is extremely unlikely that a 4 KB per cell description field for work tickets is going to find itself exactly occurring somewhere else in the enterprise.

In one implementation, at 414, the process determines whether the value change the column cardinality. If it does, the new cardinality is recorded at 416. Cardinality on a per-table basis is an annotation about the values in this column related to the rows of the table. For example, if the table is a table of computers, the name of the computer probably has a "unique" (to one) cardinality, because no two rows have the same value. For the "Vendor" column, it probably has a "to many" cardinality, because there are many duplicate values—e.g., every row might only have a value of either "HP", "IBM" or "Dell". The cardinality is initially "None".

If the current cardinality is "None", the cardinality stays "None" if the value is blank, otherwise, the cardinality becomes "Unique".

In one implementation, if the current cardinality is "Unique", the cardinality stays "Unique" if the value is blank, or has not been seen before in this column. If the value has been seen before, the cardinality becomes "Unique with duplicates", with an initial duplicates count of 1.

In one implementation, if the current cardinality is "Unique with duplicates", the cardinality stays "Unique with duplicates" if the value is blank, or has not been seen before in this column.

In one implementation, if the value has been seen before, increment the number of duplicates. If the number of duplicates is over MAX_UNIQUE_DUPLICATES (we use 5 by default), the cardinality becomes "Many", and processing the column for cardinality stops—once a column has been flagged as "Many", no further state changes are possible/necessary. MAX_UNIQUE_DUPLICATES can also be specified as a percentage of the number of rows in the table.

In one embodiment, "unique with duplicates" is treated as "Many". It may be treated as a separate state for advisory/troubleshooting purposes. In commercial environments, there may be a few duplicates of asset tags in a large row computer list. While, for the purposes of mathematical modeling, it may be desirable to treat this as a "to Many" column, the "unique with duplicates" state identifies to the user that this occurs and makes it easy for them to provide hints to ensure that this column remains unique (such as by specifying that non-unique values should be removed from the table prior to processing).

At 418, the process of this embodiment determines whether the type is linkable. If the value is not linkable to any corresponding data (for example, Numbers are not linkable, but Strings and IP addresses are), stop processing this column.

At 420, the process of this embodiment determines whether the value is in the dictionary. After applying any user specified changes to the value (such as prefixing or suffixing for disambiguation, or explicit table/value map lookups to shortcut the schema), look the value up in a case insensitive central dictionary. The description received for each value includes the set of table/column pairs that value already exists in.

If it is not, the process determines whether the value is in the list of non-linking values at 422.

If it is not, the value is added to the dictionary and associated with the table/column 426. Look the value up in the non-linking values list. If it is in that list, continue to the next value. The value is added to the dictionary with the description recording the current table and column being processed.

At 424, in this embodiment, if the value is in the dictionary, the table/column is associated with the dictionary entry. Concepts are merged as necessary.

If the table/column pair currently being processed does not already have an associate Concept (and the first time the column is processed it will not):

If the table/column pair in the dictionary's set does not already have an associated Concept, create a new Concept and associate both table/columns with it.

If the table/column pair in the dictionary's set does already have an associated Concept, associate the table/column currently being processed with that Concept.

If the table/column pair currently being processed in this embodiment does already have an associate Concept:

1. If the table/Column pair in the dictionary's set does not already have an associated Concept, associate that table, column with the Concept of the currently being processed table/column pair.

2. If the table/column pair in the dictionary's set does already have an associated Concept, merge that Concept into this concept by associating all table/columns associated with that Concept to this Concept, and remove the old Concept.

If some change has been made, above (that is, one changes the association of the table/column pair), associate the value currently being processed with the Concept. This is advisory information that can be used after the algorithm is complete to intuitively understand what has occurred and why, as well as troubleshoots problems with overly aggressive linkage. At 428, an advisory value is recorded if a change was made.

Figure 5:
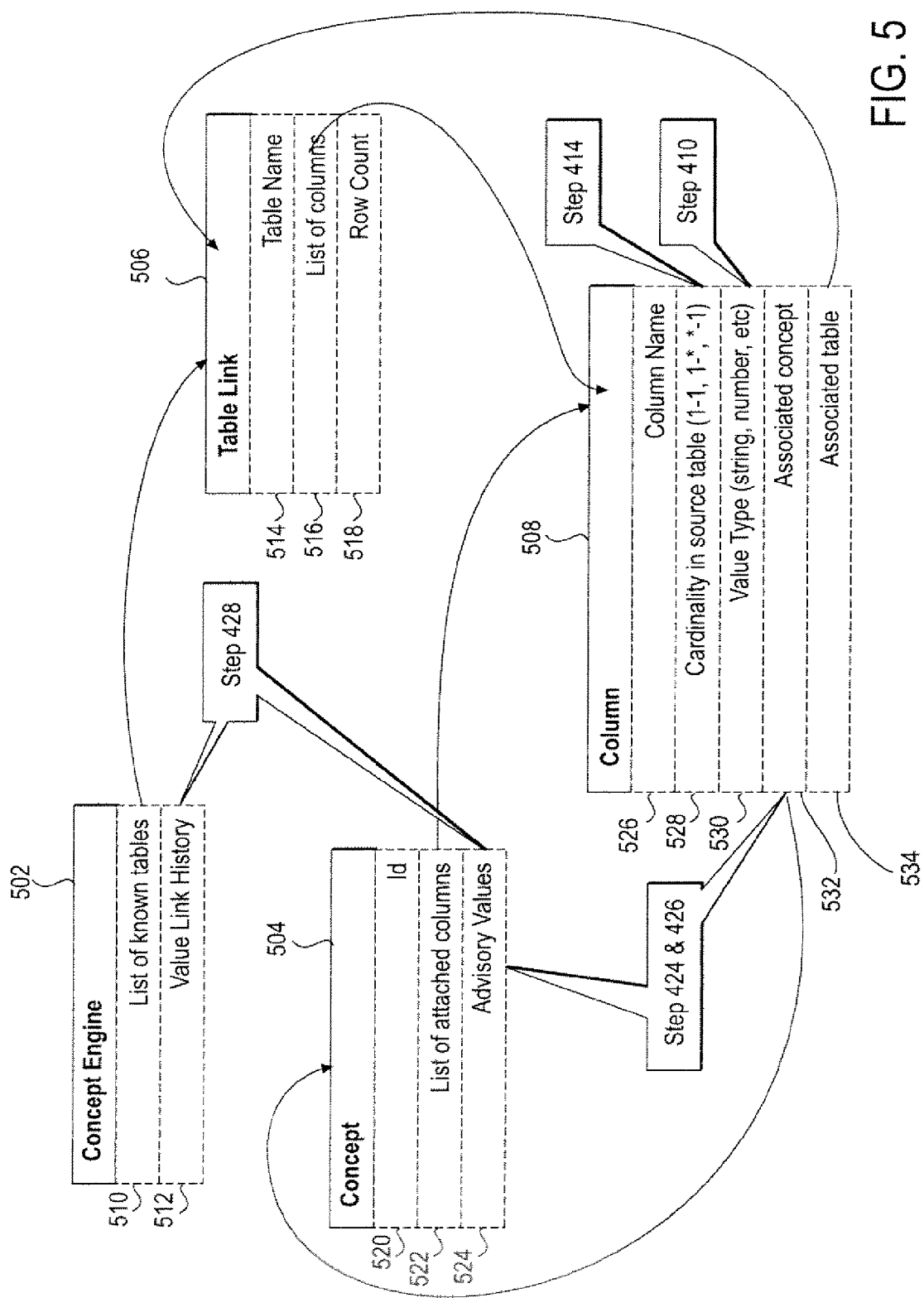
FIG. 5 is a block diagram illustrating another embodiment of the schema of FIG. 3.

FIG. 5 is a block diagram illustrating another embodiment of the schema of FIG. 3 with implementation classes. The graph is stored as the output of the first pass inference and is used in subsequent steps. Concept Engine 502 includes a List of Known Tables 510 and Value Link History 512. Table Link 506 includes Table Name 514, List of Columns 516, and Row Count 518. Concept 504 includes ID 520, List of Attached Columns 522, and Advisory Values 524. Column 508 includes Column Name 526, Cardinality in Source Table 528, Value Type 530, Associated Concept 532, and Associated Table 534.

The relationship between Value Link History 512 and Advisory Values 524 is determined as previously described at 428 of FIG. 4. The relationship between Advisory Values 524 and Associated Concept 532 is also determined as previously described at 424 and 426 of FIG. 4. Cardinality in Source Table 528 is determined as previously described at 414 of FIG. 4. Value Type 530 is determined as previously described at 410 of FIG. 4.

Figure 6:
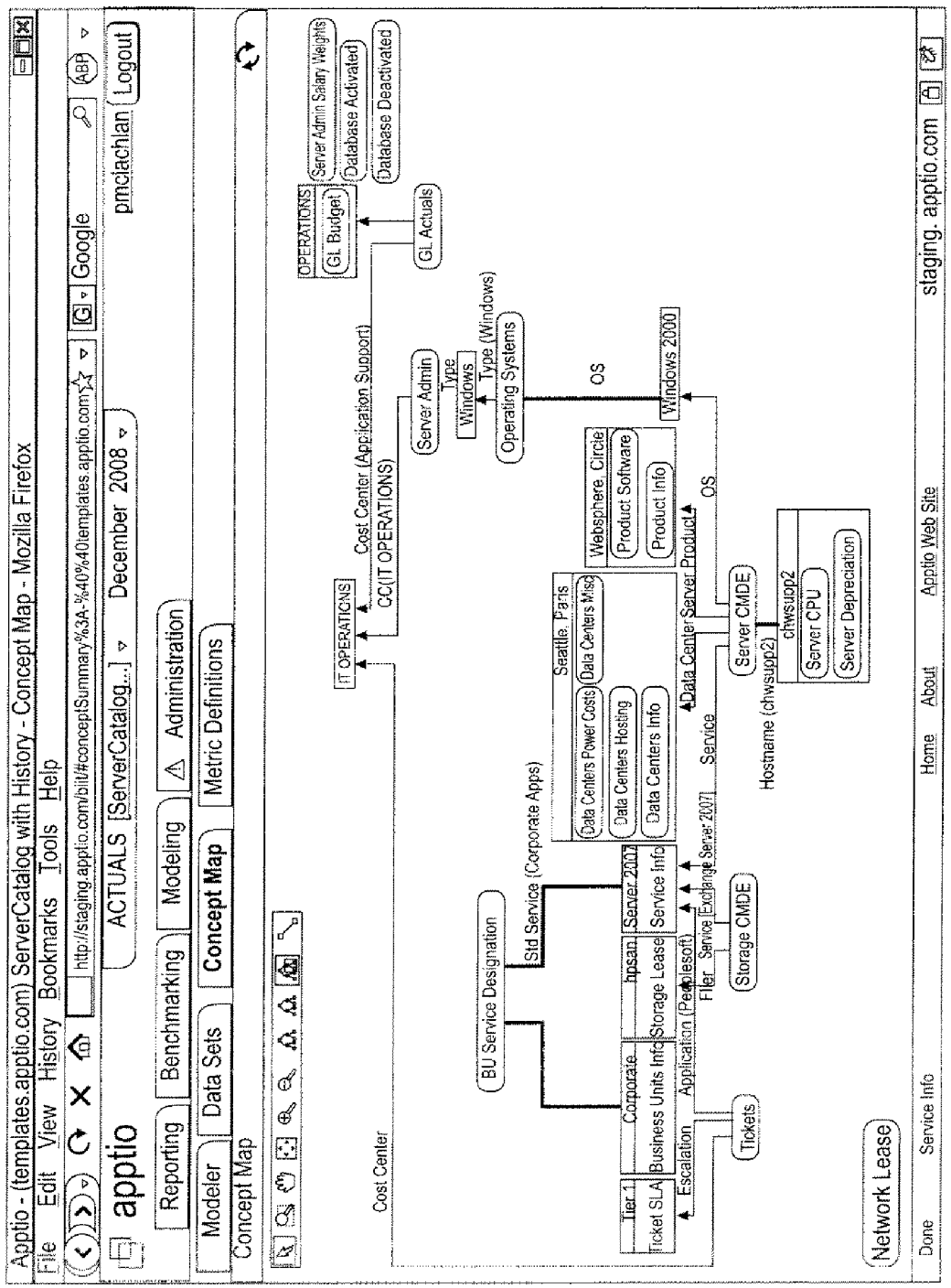
FIG. 6 is a screenshot of an example of a schema generated by an inference engine module.

FIG. 6 is a screenshot of an example of a schema generated by an inference engine module.

Figure 7:
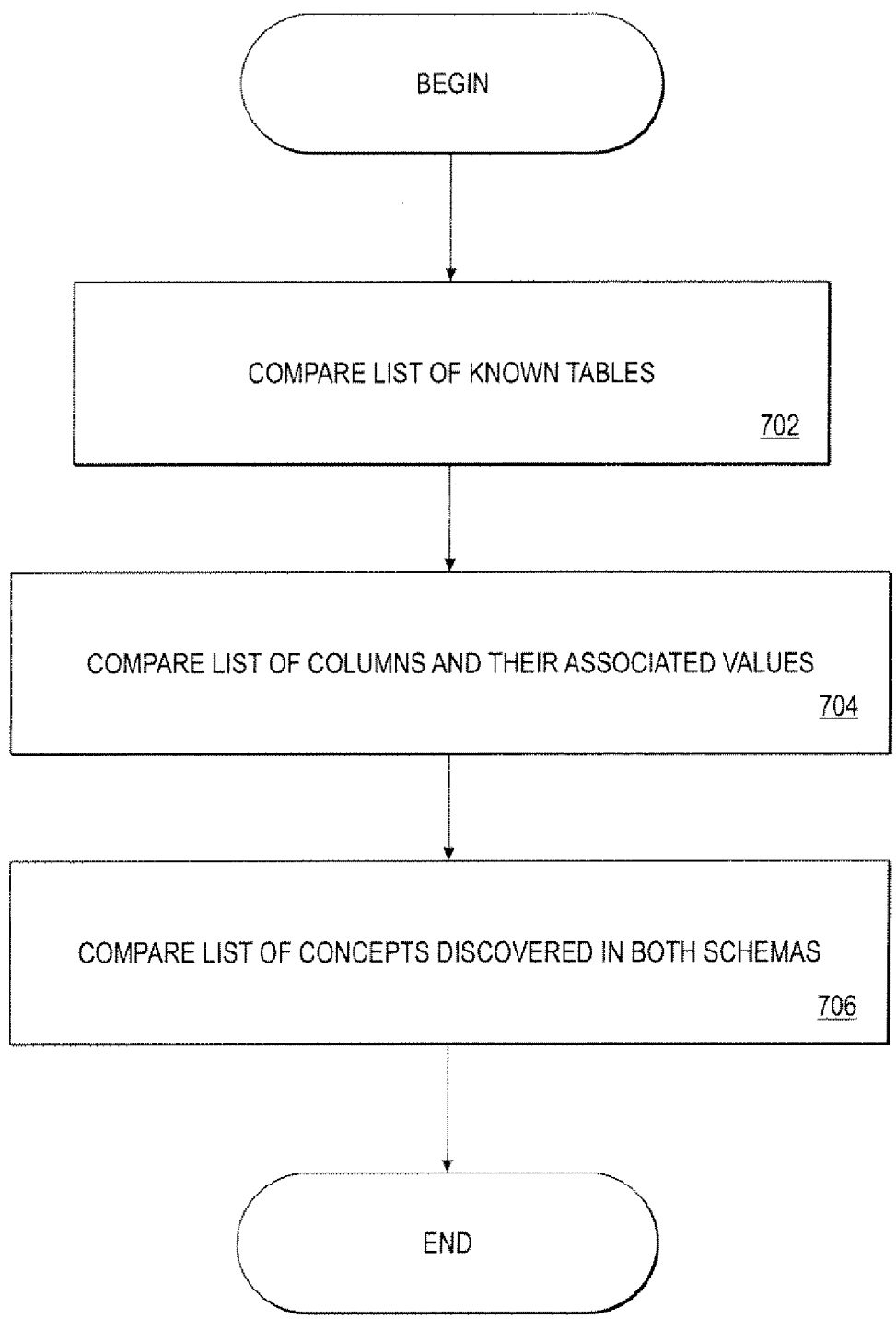
FIG. 7 is a flow diagram illustrating one embodiment of a method for comparing schemas.

Inference Engine 110 also performs a schema comparison. FIG. 7 is a flow diagram illustrating one embodiment of a method for comparing schemas as performed by Inference Engine 110. As the schema is encoded as a simple table meta-data graph (see details), it is possible to generate schemas from two different but similar data sets (such as month to month) and compare them in order to determine, for example:

Inference Engine 110 detects when relationships between tables have changed in a way that invalidates an up-stream calculation model. For example, if a Computer can now exist in two different Data Centers, any calculation model that relied upon knowing which Data-Center a Computer is in is invalidated and must be re-drawn.

Inference Engine 110 detects the introduction of values that do not map to other tables as they otherwise do. For example, the situation where the Service Servers table is updated to include a new Service (and either the SLAs table is not updated or otherwise does not have the new service included) can be detected. (Unmapped rows can obviously be detected in the general case from a single model, also—both usages are useful)

At 702 in this embodiment, Inference Engine 110 compares the list of known tables and records any new or missing tables. At 704, for each table, Inference Engine 110 compares the list of columns and their associated values (cardinality, value type) and records any new or missing columns as well as any changes. For both schema's, Inference Engine 110 adds the associated concept to a set of concepts, if it is not already there.

At 706, Inference Engine 110 compares the list of concepts discovered in both schemas and records any new or missing concepts, and any difference of the columns associated with that concept. Inference Engine 110 further generates a fully linked table given a schema and a starting table/column.

Figure 8:
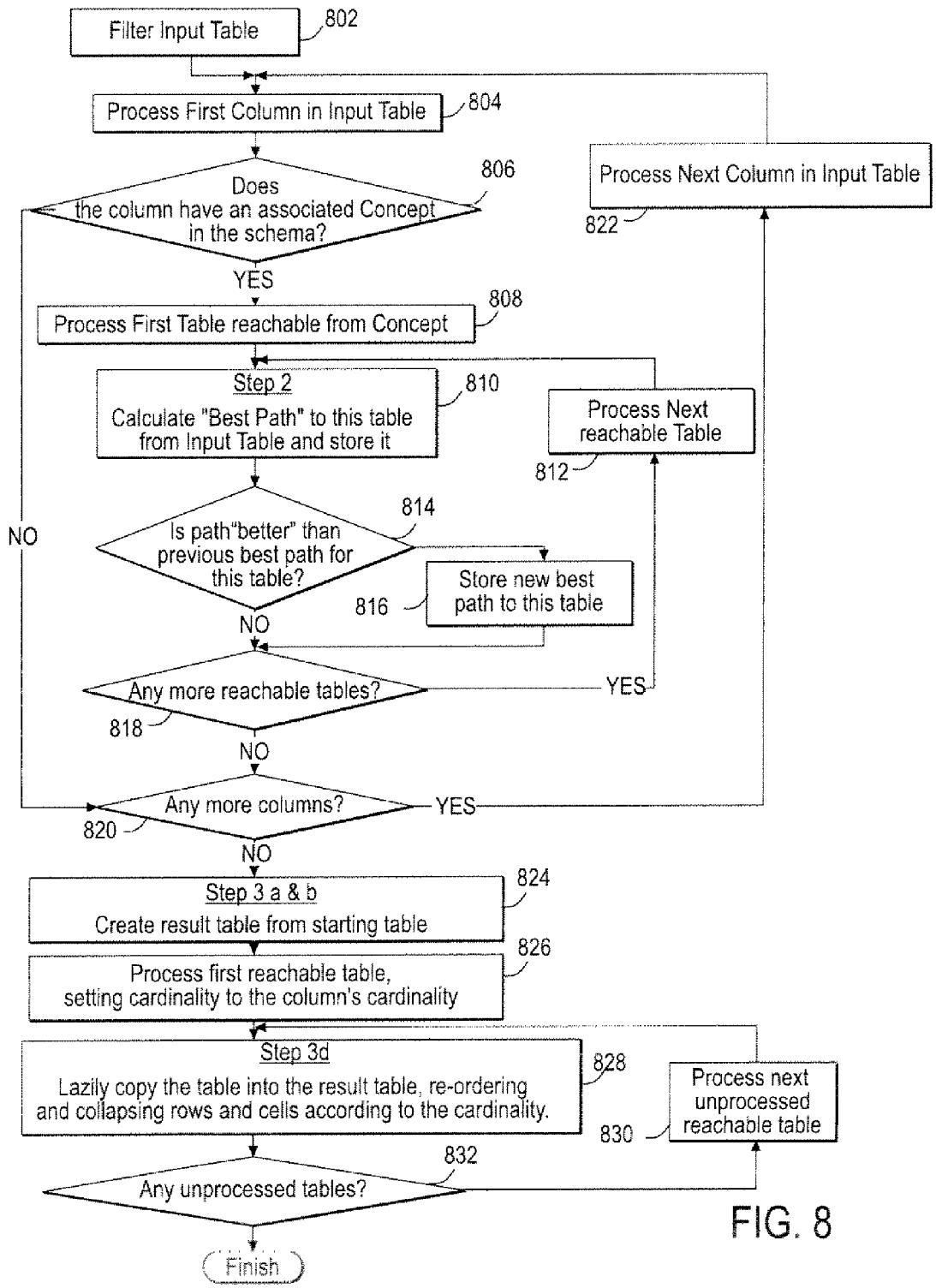
FIG. 8 is a flow diagram illustrating one embodiment of a method for generating a linked table based on the generated schema of and a starting table.

FIG. 8 is a flow diagram illustrating one embodiment of a method for generating a linked table based on the generated schema and a starting table. At 802, the starting table is filtered to remove any rows where all of the starting columns do not have values. The rest of the algorithm in this embodiment works off this filtered table as described below in reference to this FIG. 8.

At 804, Inference Engine 110 processes the first column of the input table. By iterating all of the columns, Inference Engine 110 looks up the list of Concepts that are associated with this table. For each concept, Inference Engine 110 recursively traverses the object graph (depth first), preferably never revisiting a table that was already seen (this is tracked with a simple set of tables).

At 806, Inference Engine 110 determines whether the column has an associated concept in the schema. If it does, Inference Engine 110 processes the first table reachable from the concept at 808.

At 810, the "Best Path" is calculated to this table from Input Table. For each table, discover the "best path" from the source table to this destination table. This is done in this embodiment as follows:

a. Create a "BestLinkPath" object to hold interim results.

b. Create a stack of table/column pairs to hold the currently being processed table path. Prepare a list of stacks of table/column pairs to hold the "best" path found so far. (Where there are multiple best paths, all are kept for advisory purposes—but this is an error condition that may fail the algorithm without human intervention in the form of hints)

c. For each column in the source table (and optionally treating non-starting columns as beginning with a path length of one instead of zero, using the starting table/column as the first entry in the table path), process each concept associated with that column.

d. For each concept, process the table/columns linked to that concept.

e. If the table/column has been processed before in this traversal, continue to the next one.

f. If the table contains our destination column, determine if this is "better" or "equal to" than the currently stored "best" path. One path is better or equal to another path if:
  i. The number of "toMany" links (see step g, below) is smaller
  ii. The number of "toMany" links is equal, and the length of the path is smaller or equal.

g. Otherwise, push this table/column onto the stack (implicitly incrementing the length of the path). If the traversal is a one-to-many (follows containment) or a many-to-many, increment the number of "toMany" hops this traversal has taken.

h. If more than MAX_TRAVERSALS traversals have taken place, stop. This is an error condition that indicates the tables are too tightly linked, and further advice needs to be provided.

i. Otherwise, continue from step c), above, starting from the new table/column pair.

j. Once all concepts have been visited, pop the current table/column off the stack and continue, until a full depth-first-traversal of the graph has been completed.

At 814, Inference Engine 110 determines whether the path is "better" than the previous best path for this table. The new best path is stored in this table 816.

At 818, Inference Engine 110 determines whether there are any more reachable tables and any more columns at 820. The next reachable tables and columns are processed respectively at 812 and 822.

At 824, inference 110 creates a result table from the starting table. The "best" path between the starting table and every other table has now been identified (although some tables may not be reachable). If more than one best path exists for a table (they may all be equal according to the best path determination made above), this is an error condition and that table is not included in step (b), below. Further advice must be provided in order to link it.

Once the analysis described above has been performed, the process of this embodiment may begin producing the fully linked table as described below:

a. Create a new table to hold the resulting fully linked table. Below, this created table is referred to as the "destination table".

In this implementation, this table is lazily evaluated on a per column basis—none of the work described below is actually done for a particular column unless the downstream calculation engine actually asks for the value of a cell in that column. For purposes of various embodiments described herein, a "lazy" evaluation of a cell, row or column of a table means that the respective cell, row or column is processed with no substantial modifications of the information included therein, although various degrees of analysis may be performed on the contents of that cell, row or column (e.g., data included therein may be selectively stored in memory for subsequent processing).

One reason for performing lazy evaluation of certain tables may be for performance and resource allocation reasons since some embodiments may naturally produce tables with much more information than may be used in practice by a particular given model. The tables processed may include many hundreds of columns, and fully evaluating each column may significantly increase latency, resource allocation (e.g., memory usage, network traffic in case storage or caching is performed remotely), and the overall amount of work that must be performed.

b. Copy the starting table into the destination table.

At 826 it processes the first reachable table, sets cardinality to the column's cardinality. A table, X, is reachable from another table, Y, if the schema has identified that one or more of the columns in table X is a member of a concept that one or more of the columns in table Y is also a member of. For the purposes of this algorithm, reachability is transitive, meaning that if table Y is reachable from table X, and table Z is reachable from table Y, then table Z is also reachable from table X. For each table that is reachable from a starting table (given the calculated path to that table), perform the following steps:

At 828, Inference Engine 110 copies the table into a result table, re-ordering and collapsing rows and cells according to the cardinality. The table is copied into the destination table, where the table is re-ordered and filtered such that each row being copied matches the appropriate key in the starting table. In one implementation, the value in each cell is calculated as follows:

a. If this is a one-to-one relationship or a many-to-one relationship (from the starting table to the table being processed), simply copy the value from the destination table. Where multiple tables are being traversed, the relationship between the tables may be calculated as follows:

i. Starting with the cardinality recorded by the schema on the first traversal (i.e., one-to-one, many-to-one, or one-to-many):
  ii. Iterate down the path, changing the cardinality for each traversal as follows:
    1. If there is currently a one-to-one cardinality:
      a. If you encounter a one-to-one cardinality, the cardinality remains one-to-one.
      b. If you encounter a many-to-many, the cardinality becomes many-to-one.
      c. If you encounter a one-to-many, the cardinality becomes one-to-many.
    2. If there is currently a many-to-one cardinality:
      a. If you encounter a one-to-one cardinality, the cardinality remains many-to-one.
      b. If you encounter a many-to-many, the cardinality becomes many-to-many.
      c. If you encounter a one-to-many, the cardinality becomes many-to-many.
    3. If there is currently a one-to-many cardinality:
      a. If you encounter a one-to-one cardinality, the cardinality remains one-to-many.
      b. If you encounter a many-to-many, the cardinality becomes many-to-many.
      c. If you encounter a one-to-many, the cardinality remains one-to-many.
    b. If this is a many-to-many relationship, no value is recorded, but traversal is continued, storing a mapping between the matching many-to-many values. Later it may be that the schema collapses back to a one-to-many or many-to-one. For example, a servers table may have a many-to-one relationship with a subnet. The subnet may have a one-to-many relationship with employees who work on that subnet (thus forcing a many-to-many relationship between servers and employees). The algorithm records the subnet to employees mapping. Later, if all employees working on a particular subnet report to the same manager, it may be possible (by determining that there is only one unique value) to determine the manager for each server.
    c. If this is a one-to-many relationship:
      i. If this is a Numeric column (as auto-detected or specified as a hint), sum each matching value together.
      ii. Otherwise, count the number of unique matching values.
    At 832, if there are any unprocessed tables, the next unprocessed reachable tables are processed at 830.

FIG. 9A is an example of a starting table. In one embodiment of the present invention, the system starts with the full Network Scan table. It then uses the IP address of the computer to determine the name of the computer from the DNS table. It then uses the name of the computer to index into the Service Servers table and discovers which Product and Service the computer is associated with. It then uses the Service to determine the SLA for the computer. It then goes back and uses the IP address of the computer to match the subnet the computer is in (Data Centers.Subnet). This provides the Location information. Finally, the IP address is used to link associated Alerts with the computer:

On the first row, this is a one-to-one linkage like the other references above.

On the second row, this is a "to many" relationship, so the unique values are counted. (Three ID's and start/end times, but only two difference descriptions)

FIG. 9B is an example of a starting table about a service level agreement. The system in accordance with one embodiment starts with the SLAs table. Using the Server column, it is able to link in the DNS table to supply IP address. For "Call Centers", there is no match (the column is empty which may resolve to 0 or the empty string depending upon context). For "eBanking", there are two servers (so Server is 2), but as both servers have the same Product (ASP.NET), that string may be used verbatim. Similarly when the Data Centers table is linked, as both servers for ebanking are in London, the details about London may be preserved. When the Network Scan table is linked, numbers from both rows may be added together—so CPU is 87 (55+32), Disk Capacity is 140 (120+20). Alternatively, other operations may be performed instead of pure addition (e.g., a weighted addition). Similarly for the Alerts table—there are 4 Alerts (but only 3 unique descriptions of alerts) for ebanking, and in this example data set, no alerts for any other service.

Figure 10:
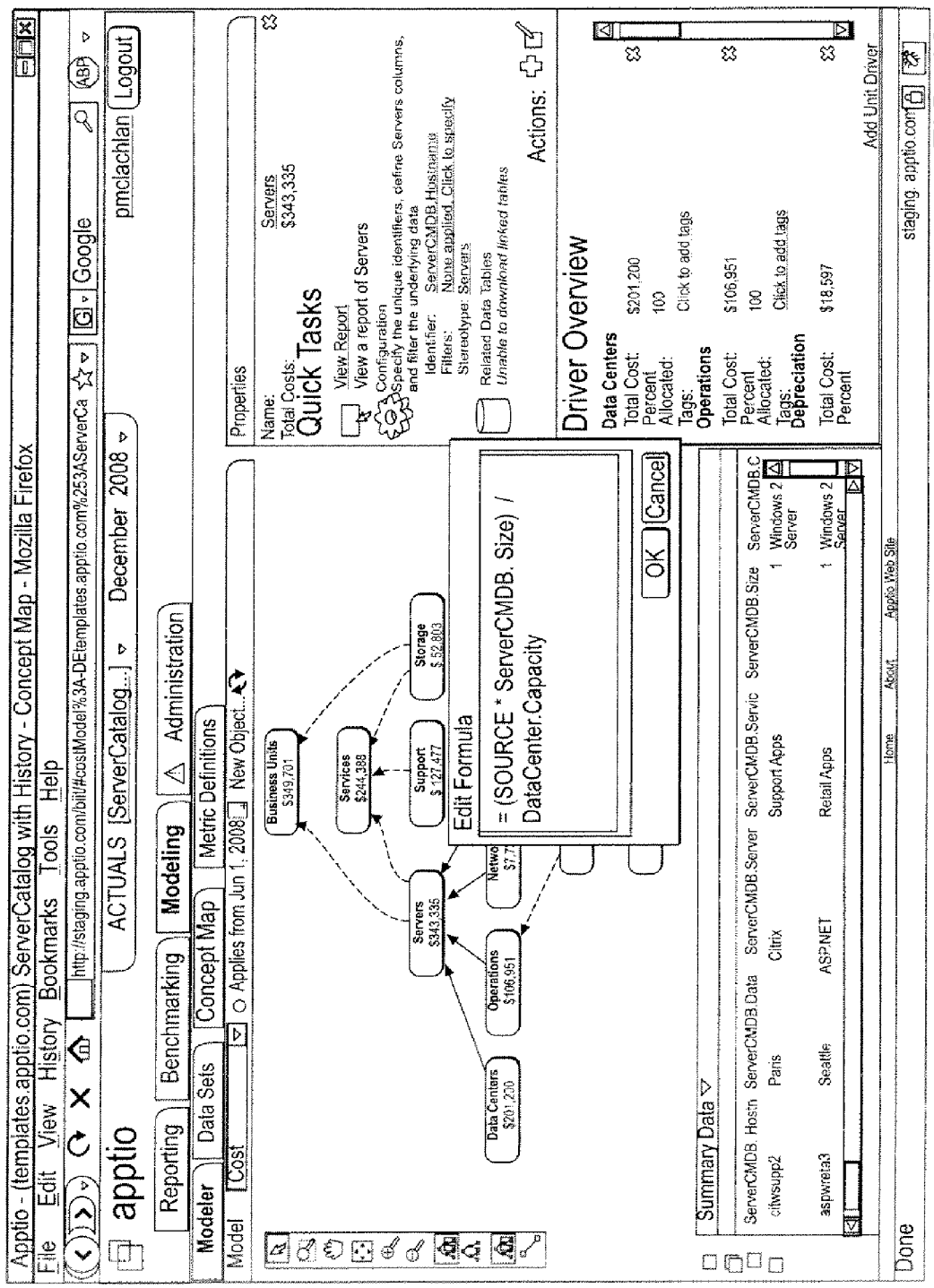
FIG. 10 is a screenshot of an example of a fully linked table.

FIG. 10 is a screenshot of an example of a fully linked table. According to an aspect of the invention, there are two types of mapping tables, "strong" and "weak".

A strong mapping table uses the schema (see previous section) in order to produce the explicit mappings between a starting table/column-set and an ending table/column-set, using an optional filter. FIG. 11A is an example of a new table. FIG. 11B is an example of a fully linked table based on the starting table of FIG. 11A. This table is based on the many to many relationships between Businesses and Services. Intuitively, one could consider that Businesses "share", Services—there is no strong containment relationship and so the principles of summing and counting do not provide reasonable insights.

First, the system is able to detect that this has occurred by tracking cardinality while traversing the schema. Secondly, in this situation, the system is able to produce a "mapping" table across the schema. The mapping table expands the fully linked table by adding rows until there is no reduction in the starting or ending columns.

FIG. 11C is another example of a mapping table with a starting column of Business and an ending column of Network Scan Host. Essentially, as the traversal encounters a "toMany", additional rows are added for each possible subsequent traversal.

The primary use of this table in one embodiment is for the calculation engine to determine which Businesses a particular computer serves, and vice versa, which computers are used by a particular Business, even if they're shared. It is also able, by counting rows or looking at other metrics in the table, to come up with reasonable ways to split the operating cost of a computer across its client Businesses. For example, if the computer located at the 172.16.2.12 IP address costs $1200 per month, a filter applied to the table can determine that Investment Bank and Retail Bank should each be responsible for half of the operating cost ($600). Where additional information is available on a per Business basis (such as revenue or number of employees), the cost can be split unevenly, according to metrics developed based on such numbers.

A strong mapping table may use the schema (for example as described in the previous section) in order to produce the explicit mappings between a starting table/column-set and an ending table/column-set, using an optional filter.

Figure 13A:
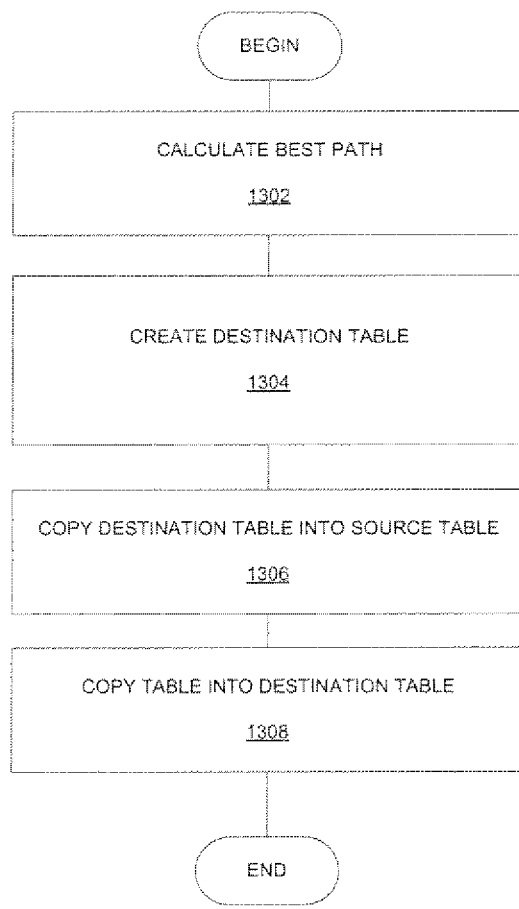
FIG. 13A is a flow diagram illustrating a method for generating a strong mapping table.

FIG. 13A illustrates a method for generating a strong mapping table in accordance with one embodiment of the present invention. At 1302, the best path between the starting table and destination table is calculated as in step 810 of the fully linked table algorithm described in FIG. 8. At 1304, a destination table is created and the specified starting columns are copied from the starting table into it, where those values pass the optional filter. At 1306, the destination table is copied into the source table as in 828 of the fully linked table algorithm described in FIG. 8. However, instead of noting but not recording many-to-many values, a new row is created for each many-to-many relationship. On the new row, duplicate the starting column values into it. At 1308, the table is copied into the destination table, where the table is re-ordered and filtered such that each row being copied matches the appropriate key in the starting table.

A weak mapping table can be generated by the system in order to make a "guess" as to the relationship between otherwise unrelated concepts. A table may be considered to be a "weak table" when it incorporates information from one or more source tables or cells without an explicit mapping to the respective source tables or cells. In one embodiment, a weak mapping table is used where there is no relationship between a starting and ending table in an applicable schema, and hints must be provided in order to relate the concepts. Because the guess may be imperfect or imprecise, it is then subject to user vetting before input into the algorithm that produces the schema. FIGS. 12A, 12B, 12C are examples of weak mapping tables.

Figure 13B:
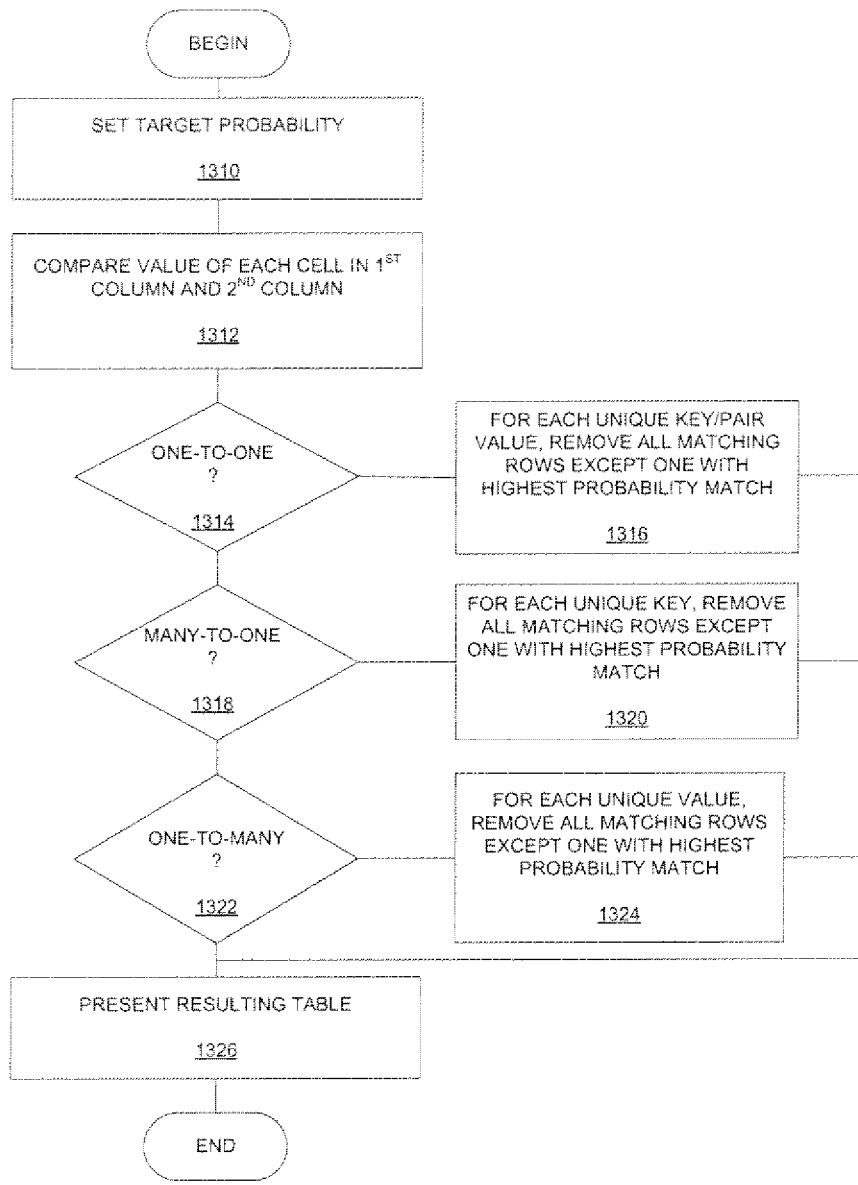
FIG. 13B is a flow diagram illustrating a method for generating a weak mapping table.

In FIG. 12A, in one implementation, the table will not be natively linked to the Business concept because "Retail" does not match "Retail Bank" and "Investment" does not match "Investment Bank". FIG. 12B illustrates another weak table. The system, in one implementation, ultimately needs a linking table of the form illustrated in FIG. 12C. This is generally easy for the user to provide, at least for small numbers of rows. On larger data sets, with thousands of rows (such as Application names or General Ledge account descriptions), manually generating these mapping tables is cumbersome. The system is able to "take a guess" at a mapping between two provided table/column pairs, using, for example, soundex codes (U.S. Pat. No. 1,261,167) and other string similarity algorithms, such as counting the number of characters the strings have in common in order to do so. This "trial" mapping table is then presented to the user for validation/vetting prior to being used in the next schema evaluation FIG. 13B is a flow diagram illustrating a method for generating a weak mapping table. Given two unrelated columns, one embodiment provides a pluggable framework for string similarity algorithms in order to do fuzzy matching and produce a table of highest-probability mappings between values in those columns.

At 1310, in this implementation, a user specifies Target Probability, (by default, this may be set to 50%), and target cardinality (one to one, one to many, many to one, or many to many). For each cell in the first column, hereafter called the "key". For each cell in the second column, hereafter called the "value". At 1312, the values are compared using the similarity function to determine a probability (0 . . . 1) of a match. If the probability is greater than or equal to the target probability, record the two values and probability into the destination table.

At 1314, if the target cardinality of one-to-one, for each unique key/value pair in the destination table, remove all matching rows except the one with the highest probability match at 1316.

At 1318, if the cardinality is many-to-one, for each unique key in the destination table, remove all matching rows except the one with the highest probability match at 1320.

At 1322, if the target cardinality is one-to-many, for each unique value in the destination table, remove all matching rows except the one with the highest probability match at 1324.

At 1326, the resulting table is presented to the user to permit them to manually make modifications to it, re-run the algorithm with a different target probability, or save the table in order to present it to the schema generation algorithm.

Figure 14:
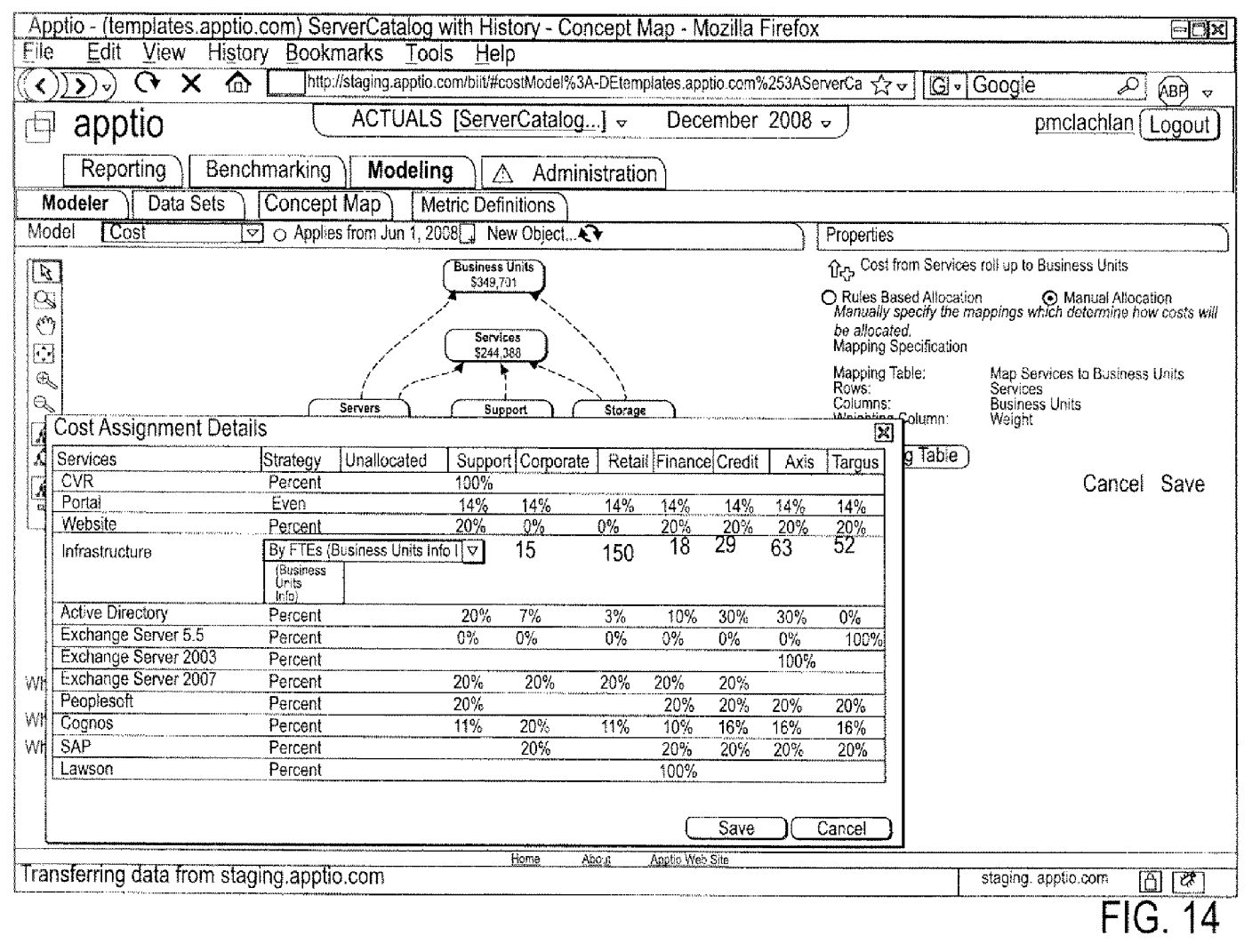

FIG. 14 is a screenshot illustrating an example of a mapping table.

Figure 15:
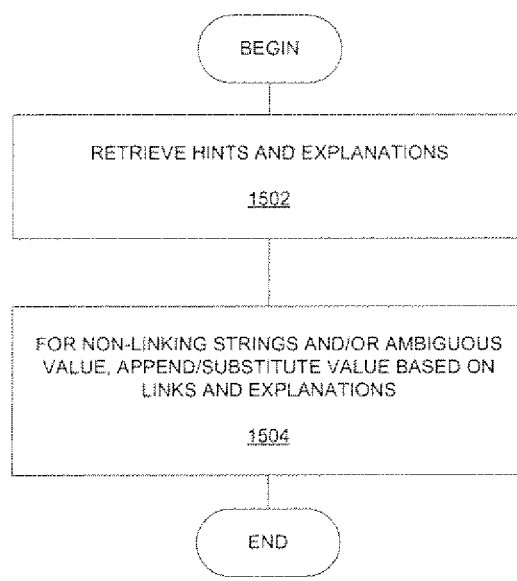
FIG. 15 is a flow diagram illustrating a method for adjusting a mapping table based on user input information.

FIG. 15 is a flow diagram illustrating a method for adjusting a mapping table based on user input information. In practice, it occurs that data contains values that should not in actuality be used to determine that there is a relationship between two tables. An example of this is the "N/A" string (Not Available). In general, it is not necessarily true that every column that has the string "N/A" in it should be linked to every other column that has that string.

The system has a built in set of values that, in various implementation, would normally not be used for linkage, such as "N/A", "Unknown" "-", "null" as well as the empty string, " ". This list of values can be customized.

Additionally, the end schema that is produced in accordance with one embodiment has, for every linkage that it makes, a few example (aka "advisory") values that it used to make the determination that those links should be made. By inspecting those values, it is trivial to add new strings to the non-linking list, or detect strings that need to be disambiguated.

Disambiguation is done using a pre-inference substitution step on a per table/column basis. For example, for the "Software" table, column "Vendor", we may choose to either globally append "vendor)" to all values, or we may choose to tweak specific values, such as "Microsoft" to "Microsoft (vendor)". This may be because we also have a "Customers" table with a "Name" column that includes "Microsoft", and if these two tables are linked, it causes an effective short-circuit of certain calculations. That is, instead of calculating the # of servers per customer by going from a Customer table to a Service table to a Service Servers table, it may simply return, for Microsoft, the number of servers that have Microsoft software on them. This is clearly a very different number. But disambiguating the term "Microsoft" into Microsoft the customer and Microsoft the vendor, the generated schema is actually able to answer both questions.

Another hint that a user may provide, in accordance with one embodiment, is to upload mapping tables that link together groups of tables that aren't otherwise connected. Consider the example schema we have discussed above without the DNS table (which matches machine names to IP addresses). Without this mapping table, there is no direct way to answer questions such as "what is the average utilization of computers serving eBanking?". This comes into play anywhere the same concept is effectively known by different names by different parts of the organization. In particular, it is useful for direct translations (such as the DNS Name/IP table), acronyms ("BLVU" to "Bellevue"), aliases ("Electronic Banking" to "eBanking") and spelling errors ("eBanking" to "eBanking"). It also permits broader groupings (introducing containment), such as a link from "eBanking" and "Call Center" to a more generic "Customer Care" concept.

As the need for complicated specifications is reduced or eliminated through application of various embodiments of this invention, business analysts (as opposed to IT professionals) are able to influence the schema.

At 1502 in this embodiment, hints and explanations are received. At 1504, for non-linking strings and/or ambiguous value, append/substitute value based on links and explanations.

Figure 16:
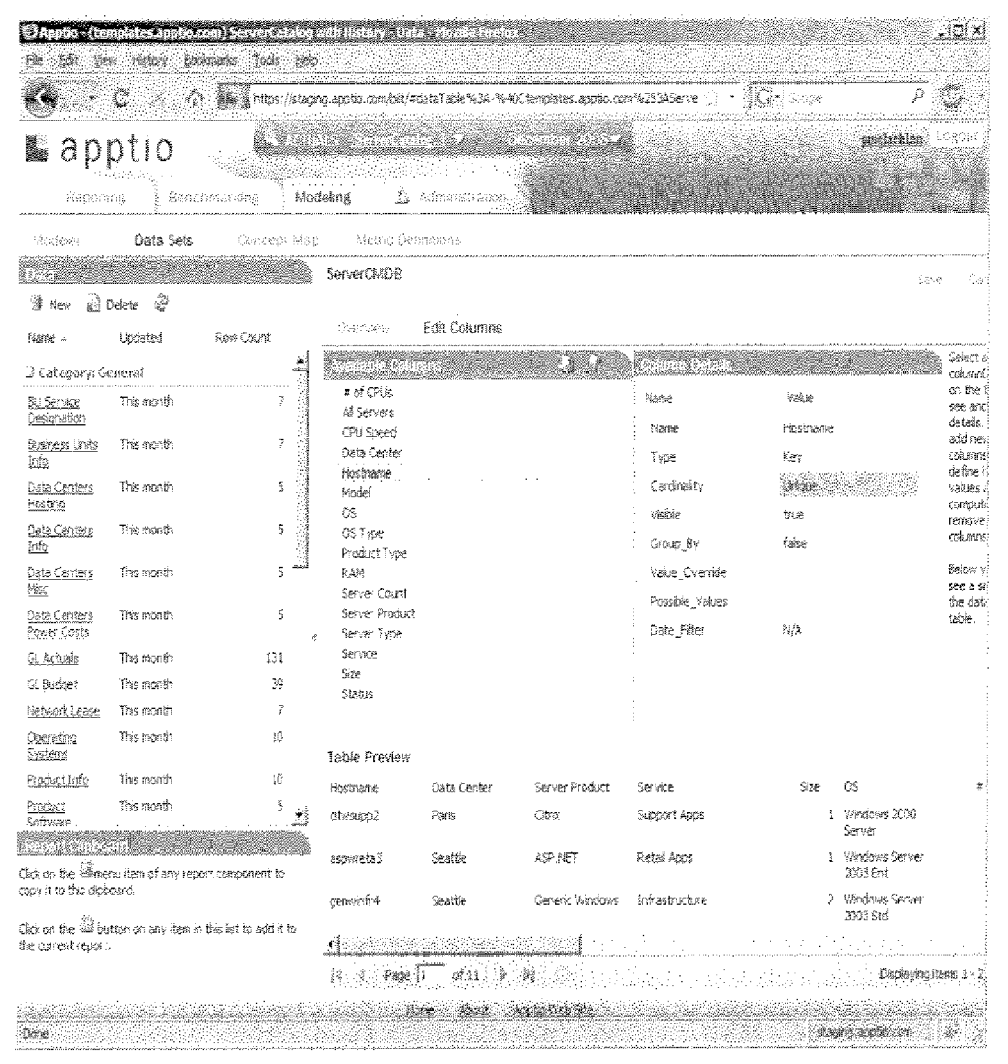

FIG. 16 is a screenshot illustrating an example of a user interface for hints specification.

Figure 17:
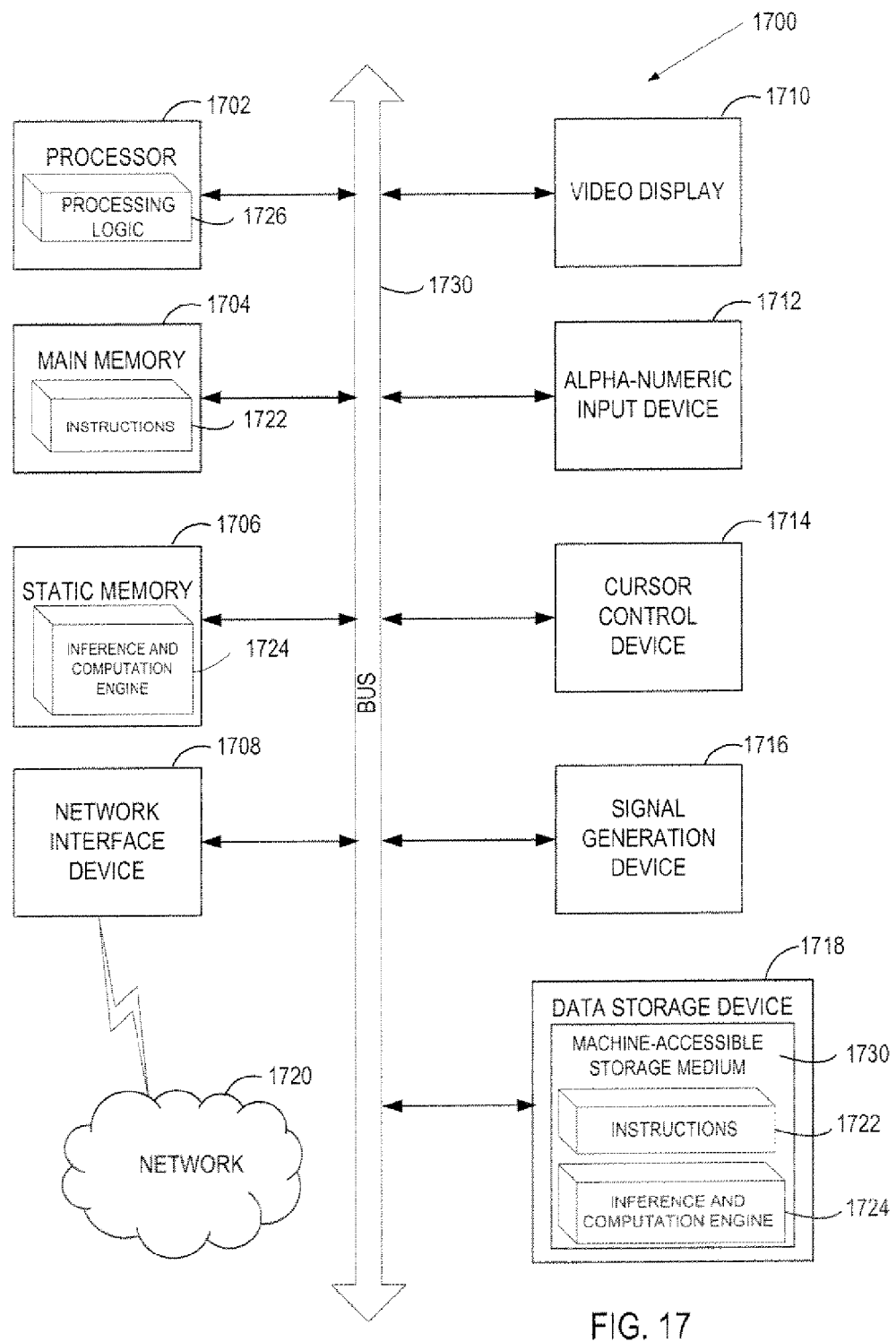
FIG. 17 is a block diagram illustrating an example of a computer system.

FIG. 17 illustrates a diagrammatic representation of a machine in the exemplary form of a computer system 1700 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, as a data processing system providing (in whole or in part) cloud computing functionality, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1700 includes a processing device 1702, a main memory 1704 (e.g., read-only memory (ROM), flash memory, dynamic random access memory (DRAM) such as synchronous DRAM (SDRAM), a static memory 1706 (e.g., flash memory, static random access memory (SRAM), etc.), and a data storage device 1718, which communicate with each other via a bus 1730.

Processing device 1702 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1702 may also be one or more special-purpose processing devices such as an application specific integrated circuit (ASIC), a field programmable gate array (FPGA), a digital signal processor (DSP), network processor, or the like. The processing device 1702 is configured to execute modules 1726 (previously described with respect to FIG. 1) for performing the operations and steps discussed herein with. In one embodiment, the modules may include hardware or software or a combination of both.

The computer system 1700 may further include a network interface device 1708. The computer system 1700 also may include a video display unit 1710 (e.g., a liquid crystal display (LCD) or a cathode ray tube (CRT)), an alphanumeric input device 1712 (e.g., a keyboard), a cursor control device 1714 (e.g., a mouse), and a signal generation device 1716 (e.g., a speaker).

The data storage device 1718 may include a computer-accessible storage medium 1730 on which is stored one or more sets of instructions (e.g., software 1722) embodying any one or more of the methodologies or functions described herein. The software 1722 may also reside, completely or at least partially, within the main memory 1704 and/or within the processing device 1702 during execution thereof by the computer system 1700, the main memory 1704 and the processing device 1702 also constituting computer-accessible storage media. The software 1722 may further be transmitted or received over a network 1720 via the network interface device 1708.

The computer-accessible storage medium 1730 may also be used to store the operational-related data computation engine 1724 as presently described. The operational-related data computation engine 1724 may also be stored in other sections of computer system 1700, such as static memory 1706.

While the computer-accessible storage medium 1730 is shown in an exemplary embodiment to be a single medium, the term "computer-accessible storage medium" should be taken to include a single medium or multiple media (e.g., a centralized or distributed database, and/or associated caches and servers) that store the one or more sets of instructions. The term "computer-accessible storage medium" shall also be taken to include any medium that is capable of storing, encoding or carrying a set of instructions for execution by the machine and that cause the machine to perform any one or more of the methodologies of the present invention. The term "computer-accessible storage medium" shall accordingly be taken to include, but not be limited to, solid-state memories, optical and magnetic media.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various embodiments of the present invention also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled

What is claimed is:

1. A computation system to process data, comprising:
  a network interface to receive operational related data relating to an Information Technology (IT) environment of an organization over a network;
  a memory device to store at least instructions and a data processing engine that is coupled to the network interface; and
  a processor device that executes the instructions and the data processing engine to perform actions, including:
    employing a schema generator to generate a schema by organizing at least part of the operational related data into at least one class of IT metric-oriented data based on at least one intrinsic characteristic of the operational related data;
    generating at least one weak mapping table for determining a relationship between a plurality of source tables that lack an explicit mapping between respective source tables based on customizable linking rules, a target probability, and a target cardinality;
    employing the organized data and the at least one weak mapping table to generate a destination table and a result table based on each row and column of a starting table and the columns of each other table that is related to the starting table, wherein any determined path between related tables is based on a dictionary concept that lists at least one or more columns;
    comparing at least a portion of the organized data of the schema in the destination table to at least a portion of the organized data of at least another schema in another destination table that is generated with other operational related data relating to the IT environment; and
    comparing at least a portion of the organized data of the schema in the result table to at least a portion of the organized data of at least the other schema in another result table that is generated with other operational related data relating to the IT environment, wherein at least one row and at least one cell of the result table is re-ordered and filtered in accordance with a key of the starting table and further re-ordered and collapsed in accordance with a cardinality, and wherein a presentation of the result table comparison enables identifying a change in the schema over time.

2. The computation system of claim 1 wherein the operational related data comprises a plurality of data tables corresponding to IT assets of the organization.

3. The computation system of claim 2 wherein the receiver is configured to receive the plurality of data tables with at least one communication port from a plurality of remote systems, each remote system including at least one data table.

4. The computation system of claim 2 further comprising:
  a storage device coupled to the schema generator, the storage device configured to store user-defined specifications on the relationship between at least two data tables, the schema generator configured to determine the relationship based on the user-defined specifications.

5. The computation system of claim 2 wherein the schema generator is configured to iteratively process each value of every column of every data table.

6. The computation system of claim 5 wherein the schema generator is configured to record a new type of column when a processed value changes the column type, to record a new cardinality when the processed value changes the column cardinality, to associate the column and table of the processed value with a dictionary entry when the processed value is in the dictionary, to add the processed value to the dictionary when the processed value is not in the dictionary.

7. The computation system of claim 2 wherein the schema generator is configured to compare two or more schemas to detect when the relationship between the data tables has changed, to detect the introduction of new values in the data tables.

8. The computation system of claim 2 further comprising:
  a table generator coupled to the schema generator, the table generator configured to process an input table based on the schema to generate an output table, the input table comprising a starting table having one or more columns, the output table identifying a subset of interrelated data included in the starting table.

9. The computation system of claim 8 wherein the table generator is further configured to process the input table and the output table based on the schema to map relationships between the input table and the output table.

10. The computation system of claim 9 wherein the table generator is further configured to estimate the relationship between unrelated data included in the input table and the output table.

11. The computation system of claim 2, further comprising when there are a plurality of unique values for a given cell in the destination table or the result table, determining a count of a number of the plurality of unique values and employing the count in the given cell.

12. A computer-implemented method to process data with a computer system machine, comprising:
  receiving operational related data related to an Information Technology (IT) environment of an organization at a data reception system;
  employing the computer system machine to generate a schema by organizing at least part of the operational related data into at least one class of IT metric-oriented data based on at least one intrinsic characteristic of the operational related data;
  generating at least one weak mapping table for determining a relationship between a plurality of source tables that lack an explicit mapping between respective source tables based on customizable linking rules, a target probability, and a target cardinality;
  employing the organized data and the at least one weak mapping table to generate a destination table and a result table based on each row and column of a starting table and the columns of each other table that is related to the starting table, wherein any determined path between related tables is based on a dictionary concept that lists at least one or more columns;
  comparing at least a portion of the organized data of the schema in the destination table to at least a portion of the organized data of at least another schema in another destination table that is generated with other operational related data relating to the IT environment; and comparing at least a portion of the organized data of the schema in the result table to at least a portion of the organized data of at least the other schema in another result table that is generated with other operational related data relating to the IT environment, wherein at least one row and at least one cell of the result table is re-ordered and filtered in accordance with a key of the starting table and further re-ordered and collapsed in accordance with a cardinality, and wherein a presentation of the result table comparison enables identifying a change in the schema over time.

13. The computer-implemented method of claim 12 wherein the operational related data comprises a plurality of data tables corresponding to IT assets of the organization.

14. The computer-implemented method of claim 13 further comprising:
receiving the plurality of data tables with at least one communication port from a plurality of remote systems, each remote system including at least one data table.

15. The computer-implemented method of claim 13 further comprising:
storing user-defined specifications on the relationship between at least two data tables; and
determining the relationship based on the user-defined specifications.

16. The computer-implemented method of claim 13 further comprising:
iteratively processing each value of every column of every data table.

17. The computer-implemented method of claim 16 further comprising:
recording a new type of column when a processed value changes the column type;
recording a new cardinality when the processed value changes the column cardinality;
associating the column and table of the processed value with a dictionary entry when the processed value is in the dictionary; and
adding the processed value to the dictionary when the processed value is not in the dictionary.

18. The computer-implemented method of claim 13 further comprising:
comparing two or more schemas to detect when the relationship between the data tables has changed, to detect the introduction of new values in the data tables.

19. The computer-implemented method of claim 13 further comprising:
processing an input table based on the schema to generate an output table, the input table comprising a starting table having one or more columns, the output table identifying a subset of interrelated data included in the starting table.

20. The computer-implemented method of claim 19 further comprising:
processing the input table and the output table based on the schema to map relationships between the input table and the output table.

21. The computer-implemented method of claim 20 further comprising:
estimating the relationship between unrelated data included in the input table and the output table.

22. A computer-readable non-volatile storage medium, having instructions stored therein, which when executed by a processor device, cause a computer system machine to perform a method to process data, comprising:

receiving operational related data related to an Information Technology (IT) environment of an organization at a data reception system;
employing the computer system machine to generate a schema by organizing the data into at least one class of IT metric-oriented data based on at least intrinsic characteristic of the operational related data;
generating at least one weak mapping table for determining a relationship between a plurality of source tables that lack an explicit mapping between respective source tables based on customizable linking rules, a target probability, and a target cardinality;
employing the organized data and the at least one weak mapping table to generate a destination table and a result table based on each row and column of a starting table and the columns of each other table that is related to the starting table, wherein any determined path between related tables is based on a dictionary concept that lists at least one or more columns;
comparing at least a portion of the organized data of the schema in the destination table to at least a portion of the organized data of at least another schema in another destination table that is generated with other operational related data relating to the IT environment; and
comparing at least a portion of the organized data of the schema in the result table to at least a portion of the organized data of at least the other schema in another result table that is generated with other operational related data relating to the IT environment, wherein at least one row and at least one cell of the result table is re-ordered and filtered in accordance with a key of the starting table and further re-ordered and collapsed in accordance with a cardinality, and wherein a presentation of the result table comparison enables identifying a change in the schema over time.

23. The computer-readable non-volatile storage medium of claim 22 wherein the operational related data comprises a plurality of data tables corresponding to IT assets of the organization.

24. The computer-readable non-volatile storage medium of claim 23 wherein the method further comprises:
receiving the plurality of data tables with at least one communication port from a plurality of remote systems, each remote system including at least one data table.

25. The computer-readable non-volatile storage medium of claim 12 wherein the method further comprises:
storing user-defined specifications on the relationship between at least two data tables; and
determining the relationship based on the user-defined specifications.

26. The computer-readable non-volatile storage medium of claim 23 wherein the method further comprises:
iteratively processing each value of every column of every data table.

27. The computer-readable non-volatile storage medium of claim 23 wherein the method further comprises:
recording a new type of column when a processed value changes the column type;
recording a new cardinality when the processed value changes the column cardinality;
associating the column and table of the processed value with a dictionary entry when the processed value is in the dictionary; and
adding the processed value to the dictionary when the processed value is not in the dictionary.

28. The computer-readable non-volatile storage medium of claim 23 wherein the method further comprises:

comparing two or more schemas to detect when the relationship between the data tables has changed, to detect the introduction of new values in the data tables.

29. The computer-readable non-volatile storage medium of claim 23 wherein the method further comprises:
processing an input table based on the schema to generate an output table, the input table comprising a starting table having one or more columns, the output table identifying a subset of interrelated data included in the starting table.

30. The computer-readable non-volatile storage medium of claim 29 wherein the method further comprises:
processing the input table and the output table based on the schema to map relationships between the input table and the output table.

31. The computer-readable non-volatile storage medium of claim 30 wherein the method further comprises:
estimating the relationship between unrelated data included in the input table and the output table.

32. A computation system to process data, comprising:
a network interface to receive operational related data relating to an Information Technology (IT) environment of an organization over a network;
a memory device to store instructions, data, and a table generator; and
a processor device that executes the instructions and the table generator, that is coupled to the network interface, and performs actions, including:
employing the table generator to process an input table based on a schema to generate an output table, wherein the schema is generated based on organizing at least a portion of the operational related data into at least one class of IT metric-oriented data;
generating at least one weak mapping table for determining a relationship between a plurality of source tables that lack an explicit mapping between respective source tables based on customizable linking rules, a target probability, and a target cardinality;
employing the organized data and the at least one weak mapping table to generate a destination table and a result table based on each row and column of a starting table and the columns of each other table that is related to the starting table, wherein any determined path between related tables is based on a dictionary concept that lists at least one or more columns;
comparing at least a portion of the organized data of the schema in the destination table to at least a portion of the organized data of at least another schema in another destination table that is generated with other operational related data relating to the IT environment; and
comparing at least a portion of the organized data of the schema in the result table to at least a portion of the organized data of at least the other schema in another result table that is generated with other operational related data relating to the IT environment, wherein at least one row and at least one cell of the result table is re-ordered and filtered in accordance with a key of the starting table and further re-ordered and collapsed in accordance with a cardinality, and wherein a presentation of the result table comparison enables identifying a change in the schema over time.

33. The computation system of claim 32 wherein the input table includes a mapping table, or a starting table comprising at least one column.

34. The computation system of claim 33 wherein the table generator is configured to apply the schema to the starting table to extrapolate the output table, the output table comprising a linked table including at least two different classes of information based on the schema.

35. The computation system of claim 32 wherein the table generator is configured to process input data organized in a plurality of input tables to identify a subset of interrelated data included in the input data corresponding to at least two classes of information based on the schema.

36. The computation system of claim 32 further comprising:
a schema generator coupled to the receiver, the schema generator configured to organize the operational related data into at least one class of IT metric-oriented data based on at least one intrinsic characteristic of the operational related data, the operational related data comprising a plurality of data tables corresponding to IT assets of the organization.

37. The computation system of claim 32 wherein the table generator is further configured to identify a plurality of intermediate tables consisting of at least two input tables that include logically-connected input data, the intermediate tables including rows and columns, to extract at least a portion of the input data included in each intermediate table, and to construct at least one output table based on the extracted input data while maintaining conceptual integrity among at least a subset of the extracted input data by collapsing at least two individual values included in the extracted input data to produce at least one corresponding aggregated value summary.

38. The computation system of claim 37 wherein the at least one aggregate value summary is the total of corresponding individual values, the average of corresponding individual values, or a measure of a statistical distribution of corresponding individual values.

39. The computation system of claim 36 further comprising:
a storage device coupled to the schema generator, the storage device configured to store user-defined specifications on the relationship between at least two data tables, the schema generator configured to determine the relationship based on the user-defined specifications.

40. The computation system of claim 39 wherein the schema generator is configured to iteratively process each value of every column of every data table.

41. The computation system of claim 40 wherein the schema generator is configured to record a new type of column when a processed value changes the column type, to record a new cardinality when the processed value changes the column cardinality, to associate the column and table of the processed value with a dictionary entry when the processed value is in the dictionary, to add the processed value to the dictionary when the processed value is not in the dictionary.

42. A computer-implemented method for processing data through the execution of instructions by a computer system machine that enables actions, comprising:
receiving operational related data relating to an Information Technology (IT) environment of an organization at a data reception system with the computer system machine;
processing an input table based on a schema to generate an output table at a table generator with the computer system machine, wherein the schema is generated based on organizing at least a portion of the operational related data into at least one class of IT metric-oriented data at a schema generator;
generating at least one weak mapping table for determining a relationship between a plurality of source tables that lack an explicit mapping between respective source tables based on customizable linking rules, a target probability, and a target cardinality;

employing the organized data and the at least one weak mapping table to generate a destination table and a result table based on each row and column of a starting table and the columns of each other table that is related to the starting table, wherein any determined path between related tables is based on a dictionary concept that lists at least one or more columns;

comparing at least a portion of the organized data of the schema in the destination table to at least a portion of the organized data of at least another schema in another destination table that is generated with other operational related data relating to the IT environment; and comparing at least a portion of the organized data of the schema in the result table to at least a portion of the organized data of at least the other schema in another result table that is generated with other operational related data relating to the IT environment, wherein at least one row and at least one cell of the result table is re-ordered and filtered in accordance with a key of the starting table and further re-ordered and collapsed in accordance with a cardinality, and wherein a presentation of the result table comparison enables identifying a change in the schema over time.

43. The computer-implemented method of claim 42 wherein the input table includes a mapping table, or a starting table comprising at least one column.

44. The computer-implemented method of claim 43 further comprising:
applying the schema to the starting table to extrapolate the output table, the output table comprising a linked table including at least two different classes of information based on the schema.

45. The computer-implemented method of claim 42 further comprising:
processing input data organized in a plurality of input tables to identify a subset of interrelated data included in the input data corresponding to at least two classes of information based on the schema.

46. The computer-implemented method of claim 42 further comprising:
organizing the operational related data into at least one class of IT metric-oriented data based on at least one intrinsic characteristic of the operational related data, the operational related data comprising a plurality of data tables corresponding to IT assets of the organization.

47. The computer-implemented method of claim 42 further comprising:
identifying a plurality of intermediate tables consisting of at least two input tables that include logically-connected input data, the intermediate tables including rows and columns with the table generator;
extracting at least a portion of the input data included in each intermediate table with the table generator; and
constructing at least one output table based on the extracted input data while maintaining conceptual integrity among at least a subset of the extracted input data by collapsing at least two individual values included in the extracted input data to produce at least one corresponding aggregated value summary with the table generator.

48. The computer-implemented method of claim 47 wherein the at least one aggregate value summary is the total of corresponding individual values, the average of corresponding individual values, or a measure of a statistical distribution of corresponding individual values.

49. The computer-implemented method of claim 46 further comprising:
storing user-defined specifications on the relationship between at least two data tables in a storage device; and
determining the relationship based on the user-defined specifications with the schema generator.

50. The computer-implemented method of claim 49 further comprising:
iteratively processing each value of every column of every data table with the schema generator.

51. The computer-implemented method of claim 50 further comprising:
recording a new type of column when a processed value changes the column type with the schema generator;
recording a new cardinality when the processed value changes the column cardinality with the schema generator;
associating the column and table of the processed value with a dictionary entry when the processed value is in the dictionary with the schema generator; and
adding the processed value to the dictionary when the processed value is not in the dictionary with the schema generator.

52. A computer-readable non-volatile storage medium, having instructions to process operational data stored therein, which when executed by a processor device, cause a computer system to perform a method comprising:
receiving operational related data relating to an Information Technology (IT) environment of an organization;
processing an input table based on a schema to generate an output table, wherein the schema is generated based organizing at least a portion of the operational related data into at least one class of IT metric-oriented data;
generating at least one weak mapping table for determining a relationship between a plurality of source tables that lack an explicit mapping between respective source tables based on customizable linking rules, a target probability, and a target cardinality;
employing the organized data to generate a destination table and a result table based on each row and column of a starting table and the columns of each other table that is related to the starting table, wherein any determined path between related tables is based on a dictionary concept that lists at least one or more columns;
comparing at least a portion of the organized data of the schema in the destination table to at least a portion of the organized data of at least another schema in another destination table that is generated with other operational related data relating to the IT environment; and
comparing at least a portion of the organized data of the schema in the result table to at least a portion of the organized data of at least the other schema in another result table that is generated with other operational related data relating to the IT environment, wherein at least one row and at least one cell of the result table is re-ordered and filtered in accordance with a key of the starting table and further re-ordered and collapsed in accordance with a cardinality, and wherein a presentation of the result table comparison enables identifying a change in the schema over time.

53. The computer-readable non-volatile storage medium of claim 52 wherein the input table includes a mapping table, or a starting table comprising at least one column.

54. The computer-readable non-volatile storage medium of claim 53 further comprising:

applying the schema to the starting table to extrapolate the output table, the output table comprising a linked table including at least two different classes of information based on the schema.

55. The computer-readable non-volatile storage medium of claim 52 further comprising:
processing input data organized in a plurality of input tables to identify a subset of interrelated data included in the input data corresponding to at least two classes of information based on the schema.

56. The computer-readable non-volatile storage medium of claim 52 further comprising:
organizing the operational related data into at least one class of IT metric-oriented data based on at least one intrinsic characteristic of the operational related data, operational related data comprising a plurality of data tables corresponding to IT assets of the organization.

57. The computer-readable non-volatile storage medium of claim 52 further comprising:
identifying a plurality of intermediate tables consisting of at least two input tables that include logically-connected input data, the intermediate tables including rows and columns;
extracting at least a portion of the input data included in each intermediate table; and
constructing at least one output table based on the extracted input data while maintaining conceptual integrity among at least a subset of the extracted input data by collapsing at least two individual values included in the extracted input data to produce at least one corresponding aggregated value summary.

58. The computer-readable non-volatile storage medium implemented method of claim 57 wherein the at least one aggregate value summary is the total of corresponding individual values, the average of corresponding individual values, or a measure of a statistical distribution of corresponding individual values.

59. The computer-readable non-volatile storage medium of claim 56 further comprising:
storing user-defined specifications on the relationship between at least two data tables; and
determining the relationship based on the user-defined specifications.

60. The computer-readable non-volatile storage medium of claim 53 further comprising:
recording a new type of column when a processed value changes the column type;
recording a new cardinality when the processed value changes the column cardinality;
associating the column and table of the processed value with a dictionary entry when the processed value is in the dictionary; and
adding the processed value to the dictionary when the processed value is not in the dictionary.

61. A computer system to process operational data, comprising:
a network interface to receive operational related data relating to an Information Technology (IT) environment of an organization over a network;
a memory device to store instructions, data, and a data processing engine and a processor device that executes the instructions and the data processing engine to perform actions, including:
organizing at least a portion of the operational related data into at least one class of IT metric-oriented data;
generating at least one weak mapping table for determining a relationship between a plurality of source tables that lack an explicit mapping between respective source tables based on customizable linking rules, a target probability, and a target cardinality;
employing the organized data and the at least one weak mapping table to generate a destination table and a result table based on each row and column of a starting table and the columns of each other table that is related to the starting table, wherein any determined path between related tables is based on a dictionary concept that lists at least one or more columns;
comparing at least a portion of the organized data of the schema in the destination table to at least a portion of the organized data of at least another schema in another destination table that is generated with other operational related data relating to the IT environment; and
comparing at least a portion of the organized data of the schema in the result table to at least a portion of the organized data of at least the other schema in another result table that is generated with other operational related data relating to the IT environment, wherein at least one row and at least one cell of the result table is re-ordered and filtered in accordance with a key of the starting table and further re-ordered and collapsed in accordance with a cardinality, and wherein a presentation of the result table comparison enables identifying a change in the schema over time.

* * * * *